(12) United States Patent
Fisher et al.

(10) Patent No.: US 10,506,820 B2
(45) Date of Patent: Dec. 17, 2019

(54) DEVICES AND METHODS FOR DOSING

(71) Applicant: SMITTEN VENTURES, INC., San Francisco, CA (US)

(72) Inventors: Robyn Sue Fisher, San Francisco, CA (US); Whitfield Janes Fowler, San Francisco, CA (US); Zachary Stephen Radding, Lafayette, CA (US); Brandon Clyde Onstott, Lafayette, CA (US)

(73) Assignee: Smitten Ventures, Inc., San Francisco, CA (US)

( * ) Notice: Subject to any disclaimer, the term of this patent is extended or adjusted under 35 U.S.C. 154(b) by 152 days.

(21) Appl. No.: 15/627,057

(22) Filed: Jun. 19, 2017

(65) Prior Publication Data
US 2017/0360059 A1 Dec. 21, 2017

Related U.S. Application Data

(60) Provisional application No. 62/351,766, filed on Jun. 17, 2016.

(51) Int. Cl.
*A23G 9/06* (2006.01)
*A23G 9/28* (2006.01)
(Continued)

(52) U.S. Cl.
CPC ............. *A23G 9/06* (2013.01); *A23G 9/12* (2013.01); *A23G 9/28* (2013.01); *A23G 9/281* (2013.01);
(Continued)

(58) Field of Classification Search
CPC .......... A23G 9/28; A23G 9/287; A23G 9/288; A23G 9/281; A23G 9/283; A23G 9/285; A23G 9/06; F25C 5/005; F25C 1/00
See application file for complete search history.

(56) References Cited

U.S. PATENT DOCUMENTS

| 1,762,081 A | 6/1930 | Schleicher |
| 2,115,742 A | 5/1938 | Newton |
| (Continued) | | |

OTHER PUBLICATIONS

The Australian National University, the BOC Liquid Nitrogen Show, Online Article located at www.questacon.edu/au/html/assets/pdf/Liquid_nitrogen.pdf, Commonwealth of Australia 2001, 6 pages.
(Continued)

*Primary Examiner* — Frantz F Jules
*Assistant Examiner* — Lionel Nouketcha
(74) *Attorney, Agent, or Firm* — Knobbe, Martens, Olson & Bear LLP

(57) ABSTRACT

Systems and methods of producing a frozen food product include mixing ingredients with a liquefied gas, e.g. liquid nitrogen. The texture and quality of the food product may be determined by sensing temperature or viscosity, and controlling the rate at which the liquefied gas flows into the mixture, i.e. dosing. This functionality may be achieved using one or more scoops, the position of which may be controlled by actuators. The dosing may be controlled by a program that receives input from one or more sensors, and the program may be responsive to input of the type or amount of ingredients being mixed. In addition, the dosing may be controlled by a human being through a user interface, e.g. by pushing a 'dose' button.

22 Claims, 31 Drawing Sheets

(51) Int. Cl.
  *A23G 9/12* (2006.01)
  *F16K 37/00* (2006.01)
  *F16K 17/00* (2006.01)
  *F25C 1/00* (2006.01)

(52) U.S. Cl.
  CPC .............. *A23G 9/283* (2013.01); *A23G 9/285* (2013.01); *A23G 9/287* (2013.01); *A23G 9/288* (2013.01); *F16K 17/00* (2013.01); *F16K 37/005* (2013.01); *F25C 1/00* (2013.01)

(56) References Cited

U.S. PATENT DOCUMENTS

| | | | |
|---|---|---|---|
| 2,404,380 | A | 7/1946 | Thormod |
| 2,409,067 | A | 10/1946 | Reed |
| 2,795,235 | A | 7/1957 | Hoyt |
| 3,061,281 | A | 10/1962 | Koch |
| 3,068,105 | A | 12/1962 | Morrison |
| 3,412,573 | A | 11/1968 | Pauliukonis |
| 3,503,757 | A | 3/1970 | Rubenstein |
| 3,797,514 | A | 3/1974 | Byers |
| 4,089,367 | A | 5/1978 | Weitzel |
| 4,219,581 | A | 8/1980 | Dea |
| 4,453,831 | A | 6/1984 | Mahon |
| 4,479,363 | A * | 10/1984 | Gibson ................ A23C 13/085 62/340 |
| 4,640,323 | A | 2/1987 | Norica |
| 4,664,529 | A | 5/1987 | Cavalli |
| 4,697,929 | A | 10/1987 | Muller |
| 4,716,822 | A | 1/1988 | O'Brien |
| 4,946,287 | A | 8/1990 | Barnard |
| 4,993,238 | A | 2/1991 | Inagaki |
| 5,098,732 | A | 3/1992 | Inagaki |
| 5,472,276 | A | 12/1995 | Ratermann |
| 5,566,732 | A | 10/1996 | Nelson |
| 5,692,392 | A | 12/1997 | Swier |
| 5,758,571 | A | 6/1998 | Kateman |
| 6,233,966 | B1 | 5/2001 | Delpuech |
| 6,510,890 | B1 | 1/2003 | Paskach |
| 6,517,057 | B1 | 2/2003 | Aichinger |
| 6,758,047 | B1 | 7/2004 | Giles |
| 6,796,706 | B2 | 9/2004 | Wilson |
| 6,925,816 | B2 | 8/2005 | Anderson |
| 7,455,868 | B2 | 11/2008 | Kennedy |
| 7,754,266 | B2 | 7/2010 | Waletzko |
| 7,938,061 | B2 | 5/2011 | Timmons |
| 8,679,566 | B1 | 3/2014 | Hancock |
| 8,778,436 | B2 | 7/2014 | Waletzko |
| 8,857,197 | B1 * | 10/2014 | Fisher ..................... A23L 3/375 62/66 |
| 9,433,230 | B1 * | 9/2016 | Fisher ..................... A23G 9/224 |
| 2003/0024401 | A1 | 2/2003 | Zetterlund |
| 2003/0035877 | A1 | 2/2003 | Best |
| 2003/0098314 | A1 | 5/2003 | Phelps |
| 2004/0107844 | A1 | 6/2004 | Kennedy |
| 2004/0251270 | A1 | 12/2004 | Davis |
| 2009/0053375 | A1 * | 2/2009 | Johnson ................ A23G 9/04 426/474 |

OTHER PUBLICATIONS

Nicholas Kurti and Herve This-Benckhard, Chemistry and Physics in the Kitchen, Scientific Amerian, Apr. 1994, pp. 66 and 71 (4 pages).

Brian P. Coppola, et al., I Scream, You Scream . . . A New Twist on the Liquid Nitrogen Demonstrations, Journal of Chemical Education, Dec. 1994, vol. 71, No. 12, p. 1080 (2 pages).

David A. Katz, Liquid Nitrogen Ice Cream, http://www.chymist.com/Liquid%20N2%20Ice%20cream.pdf (accessed Apr. 28, 2008).

H. Henry Rieke IV, Cooking with Chemistry, http://www.polsci.wvu.edu/Henry/Icecream/Icecream.html (accessed Apr. 25, 2008).

Peter Barham, The Science of Cooking, ISBN 3-540-67466-7, Springer-Verlag, Berlin, Heidelberg, New York, p. 143 (3 pages).

Liquid Nitrogen Ice Cream, available at http://www.schnozzle.org/~paulh/recipes/icevream.pdf and http://www.ed.sc.edu/ipd/high/icebream-nitrogen.pdf, undated (3 pages).

Anne Marie Helmenstine, PH.D., How to Make Liquid Nitrogen Ice Cream?, Helpscience Technology, http://helpscience.com/know_chem5.htm (Acessed Apr. 24, 2008) (2 pages).

Student Affiliates, American Chemical Society, Department of Chemistry, University of Maine, located at http://www.chemistry.umeche.maine.edu/Department/ACS.html, dated May 3, 2005 ( Accessed Apr. 24, 2008) (6 pages).

Sam Barros, Liquid Nitrogen Ice Cream!, Copyright 2000-2002 (Accessed Apr. 17, 2008) (2pages).

"Liquid Nitrogen Ice Cream,"available at http://www.everything2.com/index.pl?node_id+466728, dated Mar. 25, 2000 (Accessed Apr. 17, 2008).

Carmen Cerra, Ben and Jerry, meet Tom and Will, Iowa State Daily, Liquid Nitrogen Ice Cream a cool Idea—Science & Tech, Jan. 31, 2002 (8 pages).

DocBug: Liquid-Nitrogen Ice Cream, Liquid-Nitrogen Ice Cream, dated Nov. 26, 2004, available at http://www.dogbug.com/blog/archives/000233.html (Accessed Apr. 17, 2008) (6 pages).

Jefferson Lab , Odds-n-Ends From Jefferson Lab's BEAMS Program, Liquid Nitrogen Ice Cream, available at http://web.archive.org/web/2002061205541/http://education.jlab.org/beamsactivity/other/ln2icebream/ 1 pg. 2002.

* cited by examiner

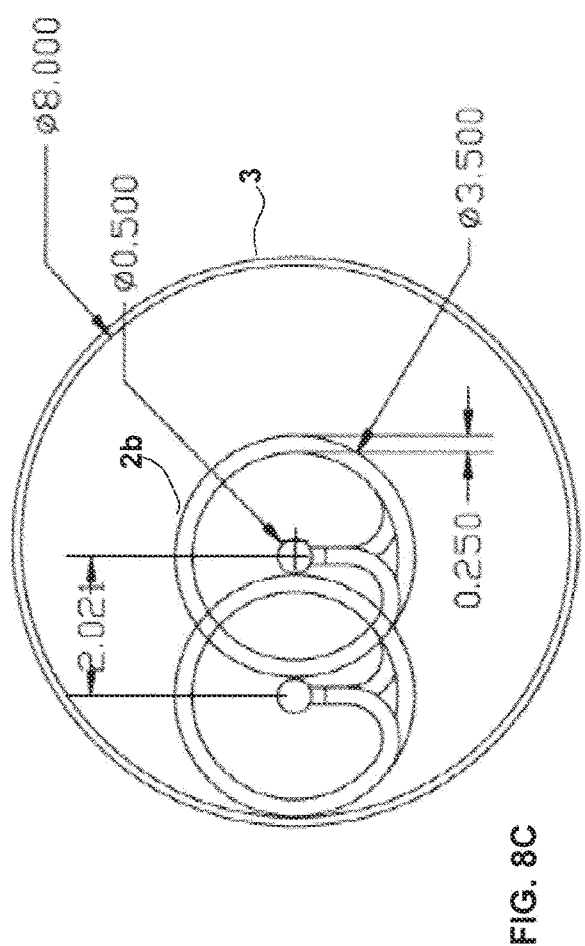

DEVICES AND METHODS FOR DOSING

CROSS REFERENCE TO RELATED APPLICATIONS

This application claims priority under 35 U.S.C. § 119(e) to U.S. Provisional Application No. 62/351,766 filed Jun. 17, 2016, and entitled "DEVICES AND METHODS FOR DOSING." The disclosure of this prior application is considered part of this application, and is hereby incorporated by reference in its entirety.

BACKGROUND OF THE INVENTION

Field of the Invention

This application relates generally to devices and methods for providing a dosed amount of liquid to a mixture of ingredients to freeze the ingredients. In particular, the application discloses devices and methods for scooping liquid nitrogen from a reservoir and providing the liquid nitrogen to the ingredients in measured doses to create a frozen confection.

Description of the Related Art

Ice cream, one of many frozen confections, is a well-known and favorite desert of millions of people. It is commonly prepared by mixing ingredients such as milk, dairy products, sugar, emulsifying agents, stabilizers, colorants and flavoring agents, sometimes in admixture with solid ingredients that are to be dispersed through the final product, agitating the ingredients while they are chilled and then freezing the mixture.

One method for making ice cream involves the application of liquid nitrogen, that is, nitrogen in a liquid state. Liquid nitrogen is a colorless and odorless liquid with a boiling point of −196 degrees Celsius. Applying liquid nitrogen to ingredients, such as those mentioned above, rapidly freezes the ingredients. An advantage of rapidly freezing ingredients to make ice cream can include a decrease in preparation time and a smoother consistent finished product.

SUMMARY OF CERTAIN INVENTIVE ASPECTS

The systems and methods disclosed herein are directed to generating frozen mixtures, and, more particularly, to generating frozen confections using cryogenic liquid. Various embodiments of the invention include systems and methods of creating frozen confections, for example, ice cream, sorbet, custard, yogurt, gelato, smoothies, frozen blended bowls (e.g., acai and pitaya bowls), and the like, using a liquid dosing system. The liquid dosing system can include mechanical and/or pneumatic components, as well as electronic components for management of automated liquid dosing. In some implementations, the liquid dosing system can be used to supply a liquefied gas, for example liquid nitrogen, to rapidly cool the ingredients, thereby producing desirable characteristics in frozen confection. Although specific types of cryogenic liquid may be referred to herein (e.g., liquid nitrogen), it will be understood by a person of ordinary skill in the art that any type of food-safe cryogenic liquid can be used.

An exemplary embodiment includes a system for reproducibly providing doses of liquid nitrogen to frozen confection ingredients. The amount of liquid nitrogen provided can be controlled by pre-measuring a quantity of liquid nitrogen, by measuring viscosity of the cooling ingredients, measuring the amount of cooling achieved, or any combination of these approaches.

One innovation includes a cryogenic liquid delivery system that includes a reservoir configured to store the cryogenic liquid at atmospheric pressure, a sensor configured to sense a quantity of cryogenic liquid in the reservoir (for example, by mass, volume, or height of the cryogenic liquid) and produce a signal of the sensed quantity. The system can also include an input valve, which can be coupled to the reservoir, the input valve configured to open and close responsive to the signal to maintain the cryogenic liquid at an operational (or preferred) level within the reservoir. A first scoop may be configured to move along a transit path, the transit path including a lower position for receiving a portion of the cryogenic liquid into the first scoop, and an upper position for dispensing the received portion of cryogenic liquid from the first scoop. The system may further include an actuator coupled to the first scoop, the actuator configured to move the first scoop between the upper and lower positions via the transit path, and a first output positioned to receive the dispensed portion of cryogenic liquid from the first scoop and to convey the received dispensed portion of cryogenic liquid from the reservoir.

In some embodiments, the cryogenic liquid is liquid nitrogen. In some embodiments, the first scoop is configured to rotate from a vertical orientation to a first horizontal orientation in order to dispense the received portion of cryogenic liquid from the first scoop, the rotation of the first scoop may occur during a transition of the first scoop from the lower position to the upper position. Herein, "vertical" refers to an upright position where the first scoop is capable of holding a volume of the cryogenic liquid, and "horizontal" refers to a position substantially perpendicular to vertical where the first scoop is not capable of holding a volume of cryogenic liquid. In some embodiments, the rotation of the first scoop around the axis is caused by contact with a first cam, the first scoop catching on the first cam and rotating as the first scoop continues moving from an intermediate position to the upper position. In some embodiments, once the first scoop is in the upper position, the first cam is actuated, causing the first cam to contact the first scoop and rotate the first scoop into the first horizontal orientation. In some embodiments, the first cam may be a fixed rod, cross-bar, or any other suitable protrusion that is positioned such that, as the first scoop travels from the intermediate position to the upper position, the first scoop contacts the first cam in such a way as to rotate the first scoop from the vertical orientation to the first horizontal orientation as the first scoop continues toward the upper position.

In some embodiments, the first scoop may be configured to be disposed in a second horizontal orientation while in the lower position. In some embodiments, the transit path further includes an intermediate position between the upper position and the lower position. In some embodiments, the intermediate position may be within 5-15 degrees of vertical. In some embodiments, the second horizontal orientation is at least 30, 60, or 90 degrees from vertical, such that the second horizontal orientation is sufficient to bring a lip of the first scoop below the operational level of cryogenic liquid such that the portion of the cryogenic liquid is received by the first scoop in the lower position and the second horizontal orientation.

In some embodiments, the first scoop is configured to rotate from the vertical orientation to the second horizontal orientation as the first scoop moves from the intermediate position to the lower position, the rotation being around an axis. The first scoop may further include two or more portions each having a different amount of buoyancy. The difference in buoyancy of the two or more portions can cause rotation of the first scoop around the axis when the first scoop contacts the cryogenic liquid. In some embodiments, the rotation of the first scoop around the axis is caused by contact between the first scoop and the liquid nitrogen. In some embodiments, the rotation of the first scoop around the axis is caused by contact with a second cam. In some embodiments, once the first scoop is in the lower position, the second cam is actuated, contacting the first scoop and rotating the first scoop into the second horizontal orientation. In some embodiments, the second cam is a fixed rod, cross-bar, or any other suitable protrusion that is positioned such that, as the first scoop travels from the intermediate position to the lower position, the first scoop contacts the second cam in such a way as to rotate the first scoop from the vertical orientation to the second horizontal orientation as the first scoop continues toward the lower position.

In some embodiments, the first scoop is configured to rotate from the vertical orientation to the first horizontal orientation when moving from the intermediate position to the upper position, the first horizontal orientation being configured to dispense the cryogenic liquid from the first scoop. The first scoop may be further configured to rotate from the vertical orientation to a second horizontal orientation when moving from the intermediate position to the lower position. In some embodiments, the rotation of the first scoop to the first horizontal orientation and the rotation to the second horizontal orientation are rotations in different directions.

In some embodiments, the system further comprises a motor coupled to the first scoop, the motor configured to move the first scoop between the upper and lower positions at frequency of at least 10 cycles per minute. In some embodiments, the first scoop is configured to hold a volume of at least 50 ml of cryogenic liquid. An "output" or "output port" as referred to herein in the context of this application, is a broad term that refers to a structure that provides a path (for example, an aperture or an opening, a pipe, a tube or the like) through which liquid can flow from inside a reservoir to a location outside the reservoir. For example, the output can provide a path from inside the reservoir to a container outside the reservoir, the container being used to hold and mix ingredients to produce a frozen product (e.g., ice cream and the like). In some embodiments, the first output comprises an upper portion and a lower portion. The upper portion of the first output may comprise a funnel-shaped receiver and the lower portion may comprise a pipe. In some embodiments, the first output is configured such that the cryogenic liquid is conveyed from the reservoir by gravity.

The system may further include a second scoop configured to move along a second transit path for delivering cryogenic liquid from the reservoir, the second transit path including a lower position for receiving a portion of the cryogenic liquid into the second scoop, and an upper position for dispensing the received portion of cryogenic liquid from the second scoop. One or more motors may be coupled to the first and second scoops and configured to move both the first and second scoops along the first and second transit paths, respectively. In some embodiments, the system further comprises a second output configured to convey the cryogenic liquid from the reservoir via the second output. In some embodiments, an angular position of the first and second scoops is controlled incrementally so as to deliver cryogenic liquid in volumes that are small fractions of the volume of each scoop. In some embodiments, a difference between the first position and the second position is within 20 degrees of vertical.

Another innovation includes a system configured for producing a frozen confectionary, the system including a container mount, a first container configured to hold ingredients of the frozen confectionary and to be attached to the container mount, and a liquid doser configured to deliver a cryogenic liquid into the first container. The doser may include a reservoir configured to store the cryogenic liquid at atmospheric pressure, a first output configured to receive cryogenic liquid and deliver the received cryogenic liquid out of the reservoir and into the first container, and a first scoop configured to transfer the portion of the cryogenic liquid within the reservoir to the first output, the first scoop configured to move between a first position for receiving the portion of the cryogenic liquid and a second position for dispensing the portion of the cryogenic liquid into the first output.

The system may further comprise one or more beaters configured to mix the ingredients and the cryogenic liquid together in the first container. In some embodiments an electronic controller controls amounts of the cryogenic liquid delivered into the container according to a selected recipe. In some embodiments, the electronic controller is further configured to control movement of the one or more beaters. Further, the electronic controller may include a user interface configured for selecting between a plurality of different recipes. The electronic controller may further include a circuit configured to detect a viscosity of the frozen confectionary. The electronic controller may further include a circuit configured to control movement of the first scoop.

The system may further include a second container configured to hold ingredients of the frozen confectionary, wherein the liquid doser includes a second scoop configured to rotate between horizontal and vertical orientations during transfer of a portion of the cryogenic liquid from the reservoir to the second container, the second scoop being further configured to receive the portion of the cryogenic liquid in a horizontal orientation.

Another innovation includes a method of operating a frozen confectionary production system having a user interface, a reservoir for holding a cryogenic liquid, an output through which cryogenic liquid flows out of the reservoir, and at least one scoop. In some embodiments, the method includes adding a plurality of doses of a cryogenic liquid to a container, the container including ingredients for a frozen confectionary. Adding each dose of the plurality of doses may include moving the at least one scoop to a first position in the reservoir to receive cryogenic liquid in the at least one scoop. Adding each dose may further include raising the at least one scoop vertically with respect to the container from the first position to a second position and dispensing at least a portion of the cryogenic liquid from the scoop into an output port disposed in the reservoir when the scoop is at the second position to provide the dispensed cryogenic liquid into the container. The method may further include mixing the ingredients of the container while adding the plurality of doses of the cryogenic liquid.

In some embodiments, the method further includes receiving at the user interface a selection of a recipe for the frozen confectionary, the recipe including information for controlling a rate to add the cryogenic liquid. In some embodiments, the method further includes receiving at the user interface a selection of a recipe for the frozen confectionary, the recipe including information of an amount of cryogenic liquid to add to the container. In some embodiments, the method further includes receiving at the interface an input selecting a recipe for a frozen confectionary, the recipe including information for a viscosity of the frozen confectionary at which to stop adding the doses of cryogenic liquid.

BRIEF DESCRIPTION OF THE DRAWINGS

FIGS. 8A-C illustrates helical beaters in a container, according to various embodiments of the invention.

DETAILED DESCRIPTION

Overview of Example Mixing Systems

Figure 1:
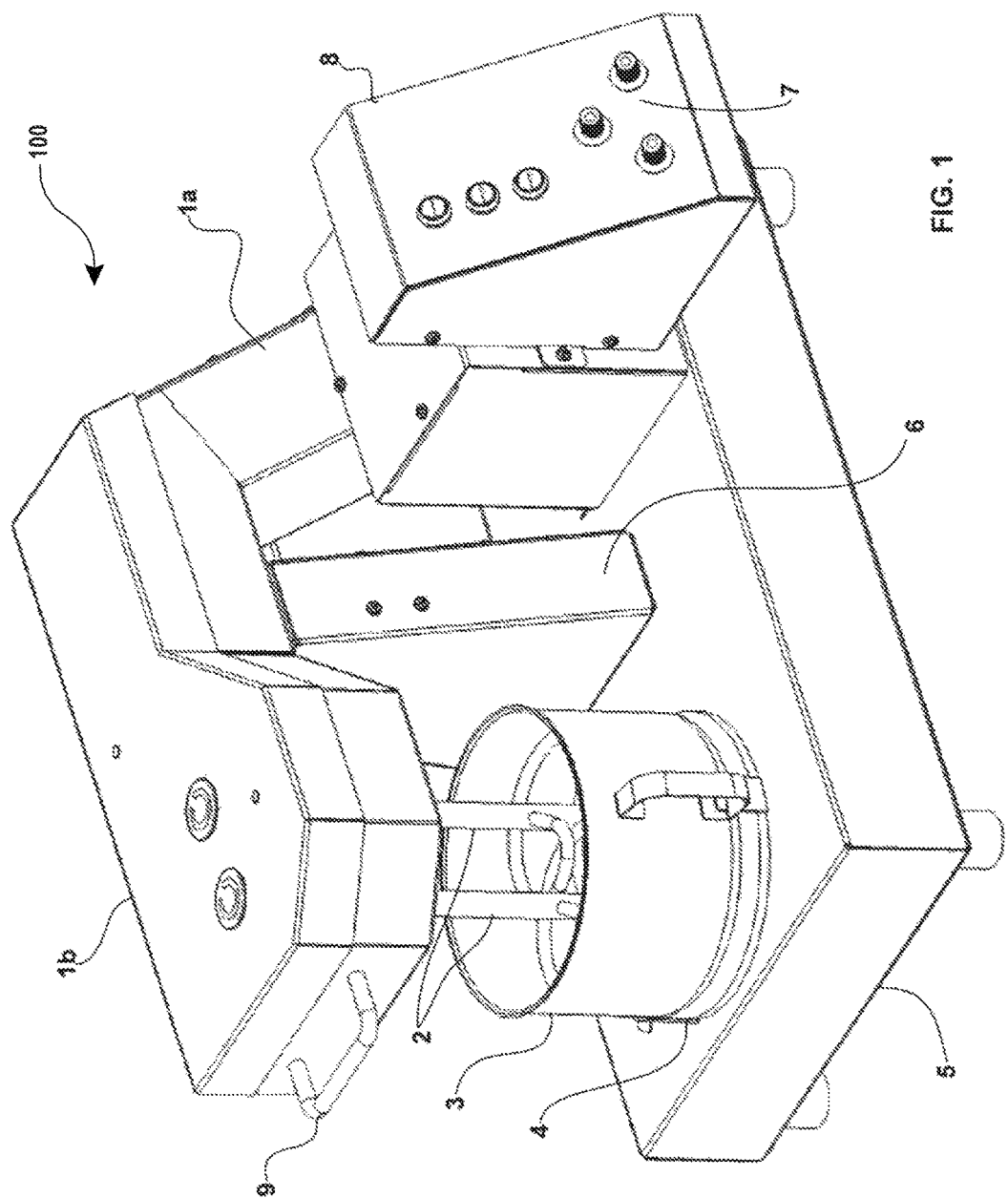
FIG. 1 illustrates a general perspective view of an ice cream production device, according to various embodiments of the invention.

FIG. 1 illustrates an example of an embodiment of a mixer system 100 (sometimes simply referred to herein as a "mixer") for mixing and freezing (or cooling) ingredients. The illustrated embodiment includes a body 5 and an arm 1*a* coupled to the body 5 by one or both of arm 1*a* and supporting structure 6. The arm 1*a* is also attached to mixer head 1*b*. Extending down from the mixer head 1*b* are one or more beaters (e.g., agitators or mixing arms) 2, illustrated in FIG. 1 as two beaters 2. Beneath the beaters 2 (relative to the orientation illustrated in FIG. 1) is a container 3. The container 3 may be removably coupled to a container mount 4, for example, by clips or locks that fasten the container 3 to the container mount 4. The container mount 4 is optionally heated and sits atop body 5. In some embodiments, the mixer head 1*b* may or may not have supporting structure 6, or the supporting structure 6 may be part of a main body of the mixer 100 that houses other components (e.g., control components), for example as illustrated in FIG. 20. As one of skill in the art will appreciate, embodiments of such mixers may include one or more of the components described herein, in various combinations, to perform the functionality of mixing ingredients and cooling ingredients (for example, by providing a certain dosage of liquid nitrogen onto the ingredients) to produce a frozen or semi-frozen product. In addition, the disclosed components may be included in other systems other than the mixers illustrated and described herein. For example, one or more components of the dosing systems illustrated in FIGS. 12-23 may be used in any suitable system that can benefit from providing a measured amount of a cryogenic liquid to cool, or freeze, other materials.

The mixer system 100 may be controlled by on/off switch or lever, or by a more detailed control panel 7. The wiring and components for the device may or may not have protected casings 8. The mixer arm 1*a* is designed such that the container 3 can be removed and inserted under the beaters 2. In this embodiment, the mixer arm 1*a* can move from the production position (shown) to an upright position, wherein the mixer head 2 tilts up and back. Additionally, the mixer head 2 may or may not have handle 9, which can be used to move the mixer head 1*b* to and from the production position. In alternative embodiments the mixer arm 1*a* and mixer head 1*b* may move along a linear or curved path with directional components not restricted to purely vertical or horizontal planes in order to clear the container 3. In alternative embodiments the mixer arm 1*a* and mixer head 1*b* may be fixed with respect to the frame of the mixer body 5, and the container 3 may move with respect to the arm, arm head, or beaters 2.

Figure 2:
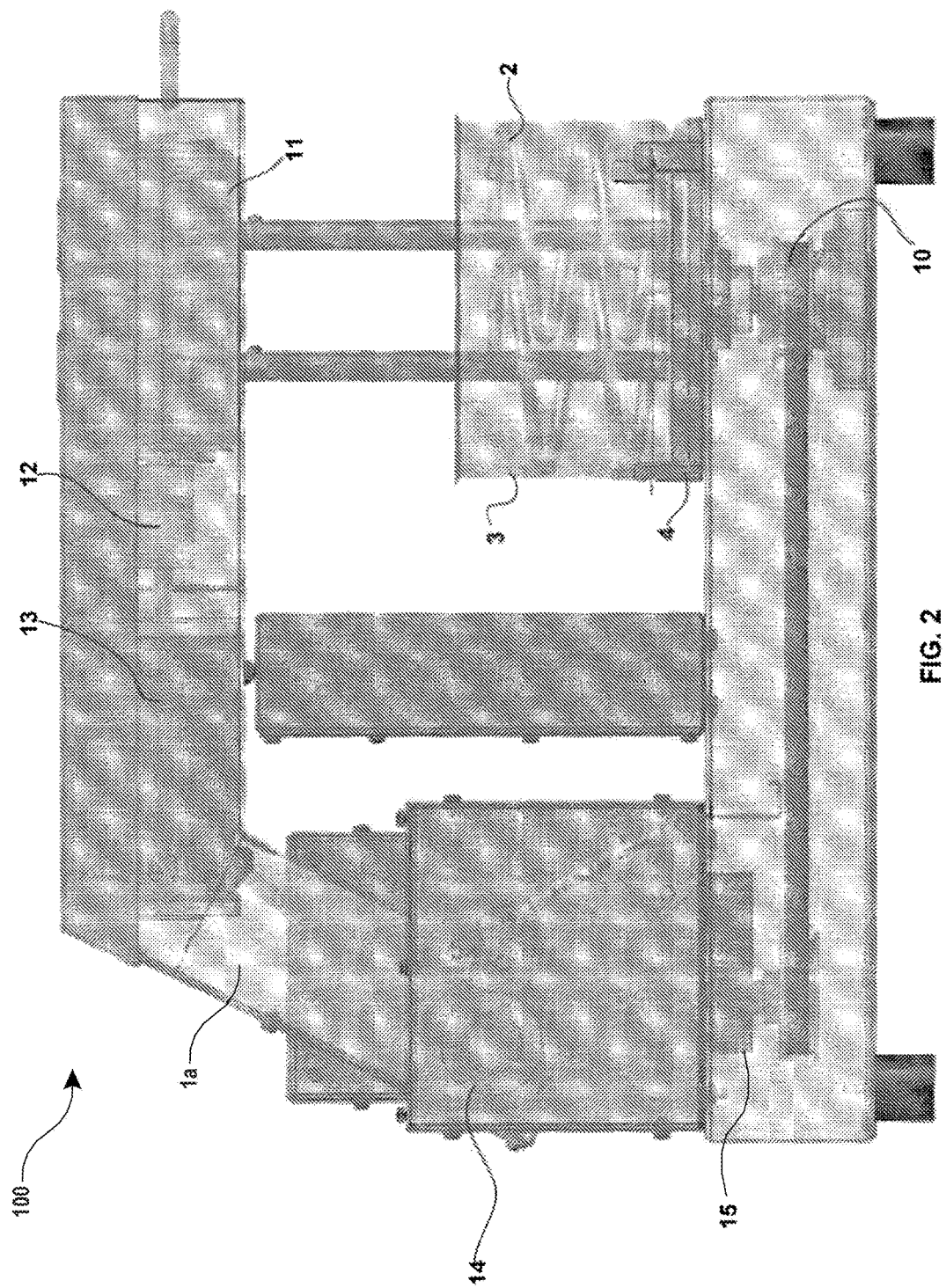
FIG. 2 illustrates the interior components of the system illustrated in FIG. 1, according to various embodiment of the invention.

FIG. 2 shows an example of a mixer system 100 having a container mount 4 connected to a belt drive 10 and powered with a mount motor (or combination of transmission and motor) 15. Container 3 is optionally connected to container mount 4 by a spindle (not shown). The spindle can be concentric or non-concentric with container 3. Beaters 2 are driven by transmission 11, which is connected to motor 13 (also visible is shaft coupler 12). In some embodiments, mixer arm 1a is raised using e.g. gas spring 14. In some embodiments, a counter-weight, cable, spring (e.g., a gas spring) and/or pulley may facilitate the movement of the mixer arm 1a.

Figure 3A:
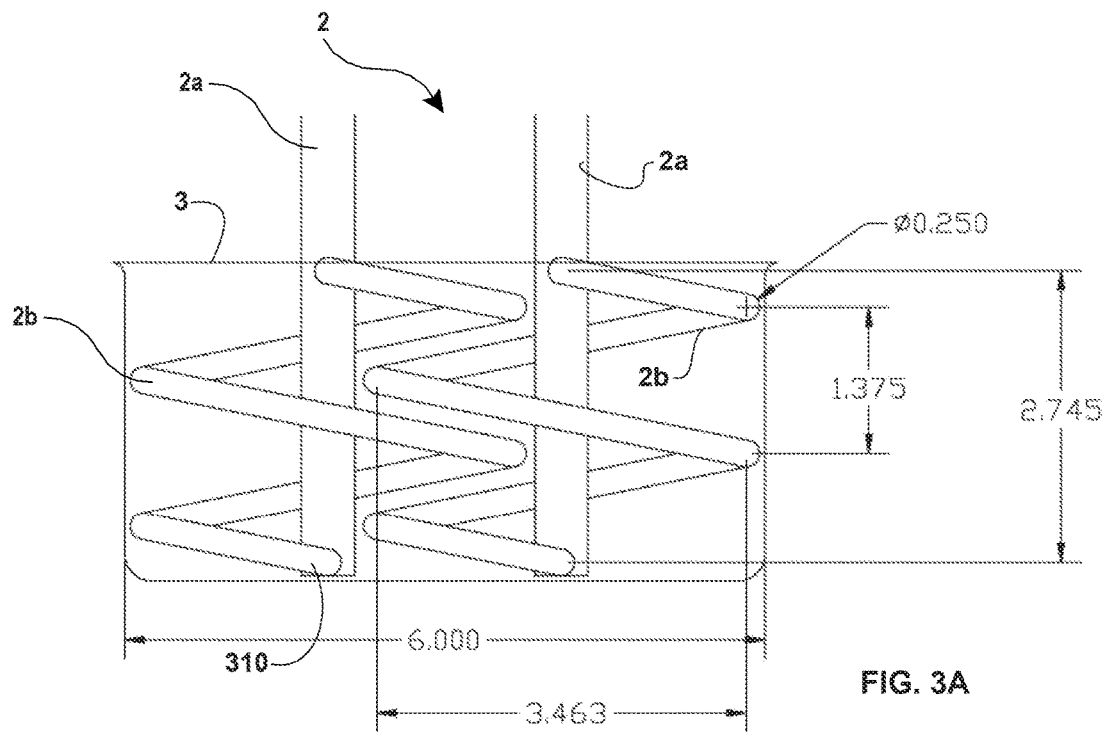
FIGS. 3A and 3B illustrate the interconnectivity of the beater and container design, according to various embodiments of the invention.
Figure 3B:
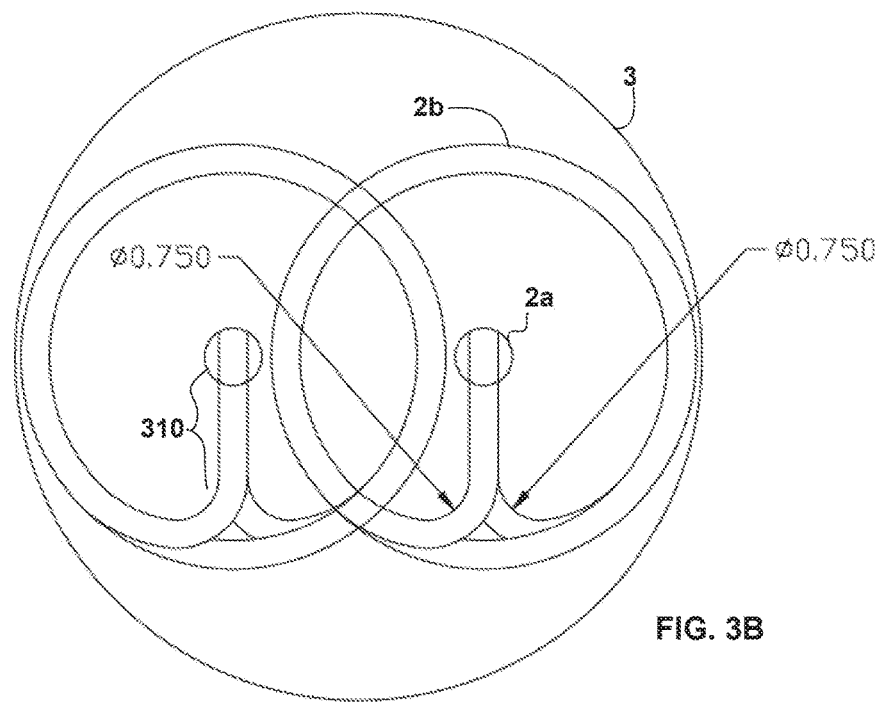

FIGS. 3A and 3B show one embodiment of the interconnectivity of the beaters 2 and container 3 design for an embodiment of a mixer system with two beaters 2. Each beater 2 has a shaft 2a and a helical spiral 2b. The beaters 2 are matched such that, when they are paired together and inserted into the mixer head 1b, the spirals fit 2b inside each other without touching the other spiral 2b or the other beater shaft 2a but within very close proximity of both. Specifically, the diameter of the spiral 2b and center shaft 2a as well as the wire diameter (i.e., thickness of the spiral) is such that the outer edge of one beater's spiral almost comes into contact with the shaft 2a of the other beater. In various embodiments this distance can be less than $1/4$, $3/16^{th}$, $1/8^{th}$, or $1/16^{th}$ inches. In addition, the pitch, diameter, spacing and wire diameter is such that, at the center intersection of the installed beaters 2, the high side of one spiral is directly under the low side of the other. Because the helical spirals 2b of the beaters 2 overlap and part of one of the helical spirals 2b is always close to part of the other of the helical spirals 2b as they turn, the beaters 2 are considered to be "interlocked." As used herein, the term "interlocked beaters" is defined to include these features. Furthermore, the high side of one spiral 2b is almost in contact with the low side of the other at the front proximity point and the low side of that same spiral is almost in contact with the high side of the other at the rear proximity point (for example, no actual contact but can be less than $1/16^{th}$, $1/8^{th}$ or $3/16^{th}$ inch apart in various embodiments). Representative measurements are shown in FIGS. 3A and 3B. In some embodiments, there may be a small amount of contact between the beaters 2 and/or between a beater 2 and the container 3, for example, due to slight play mixer system 100. These measurements are for illustrative purposes only and are not meant to be limiting. This design is scalable vertically and scalable in size. There are many possible cross-sectional designs for the spirals, including, elliptical, rectangular, circular, etc.

In this embodiment of the beater 2 and container 3 design, the beaters 2, when installed into the mixer head, are sized to closely fit the interior walls of the container 3, such that the outer edge of each spiral 2b is in very close proximity with the interior wall of the container 3. For example, in various embodiments, separation between adjacent surfaces of helical spirals 2b and the side of container 3 is less than about $1/16^{th}$, $1/8^{th}$ or $3/16^{th}$ inch, or between 0.010 inches and 0.200 inches. In some embodiments the separation is larger, for example between 0.200 inches and 0.300 inches (or larger), however, certain functionality may be reduced with increased spacing including for example, the mutual ingredient wiping effect of the beaters, and reduced efficiency of mixing, which can affect the product. In a preferred embodiment, the separation between adjacent surfaces of helical spirals 2b and the side of container 3 can be 0.064 inches to 0.081 inches. Due to the close proximity, under operational conditions the beater 2 may make contact with the other beater 2 or the container 3. While this close fitting container 3 was found to be the advantageous, a larger container 3 would also be possible, as long as the diameter of the collective beaters 2 is longer than the radius of the container (See, for example, FIGS. 8A-C). Additionally, an off-center container mount 4 could be used. Regardless, the taper of the helical spirals 2b should match that of the container 3—for example, if the helical spirals 2b do not taper, as shown in this variation, then the container 3 is straight-sided and flat-bottomed, such that the bottom of the helical spirals 2b are able to be within very close proximity to the interior bottom of the container 3.

In some embodiments, a region 310 of helical spirals 2b is optionally parallel to a bottom of container 3 and is optionally straight. Region 310 is at a part of helical spirals 2b closest to the bottom of the container 3. In various embodiments all or most of region 310 is less than $1/16^{th}$, $1/8^{th}$ or $3/16^{th}$ inch from the bottom of container 3, or between 0.010 inches and 0.200 inches. In some embodiments, the region 310 can be positioned between 0.064 inches and 0.081 inches from the bottom of container 3. As such, in some embodiments, essentially all of the bottom is cleaned by the relative motion of container 3 and beaters 2. In some embodiments, the positioning of the container 3 and the beaters 2 produces a larger separation between the container and the beaters 2, and in such cases the generation of the product may be affected (for example, consistency of the mixture).

Figure 4:
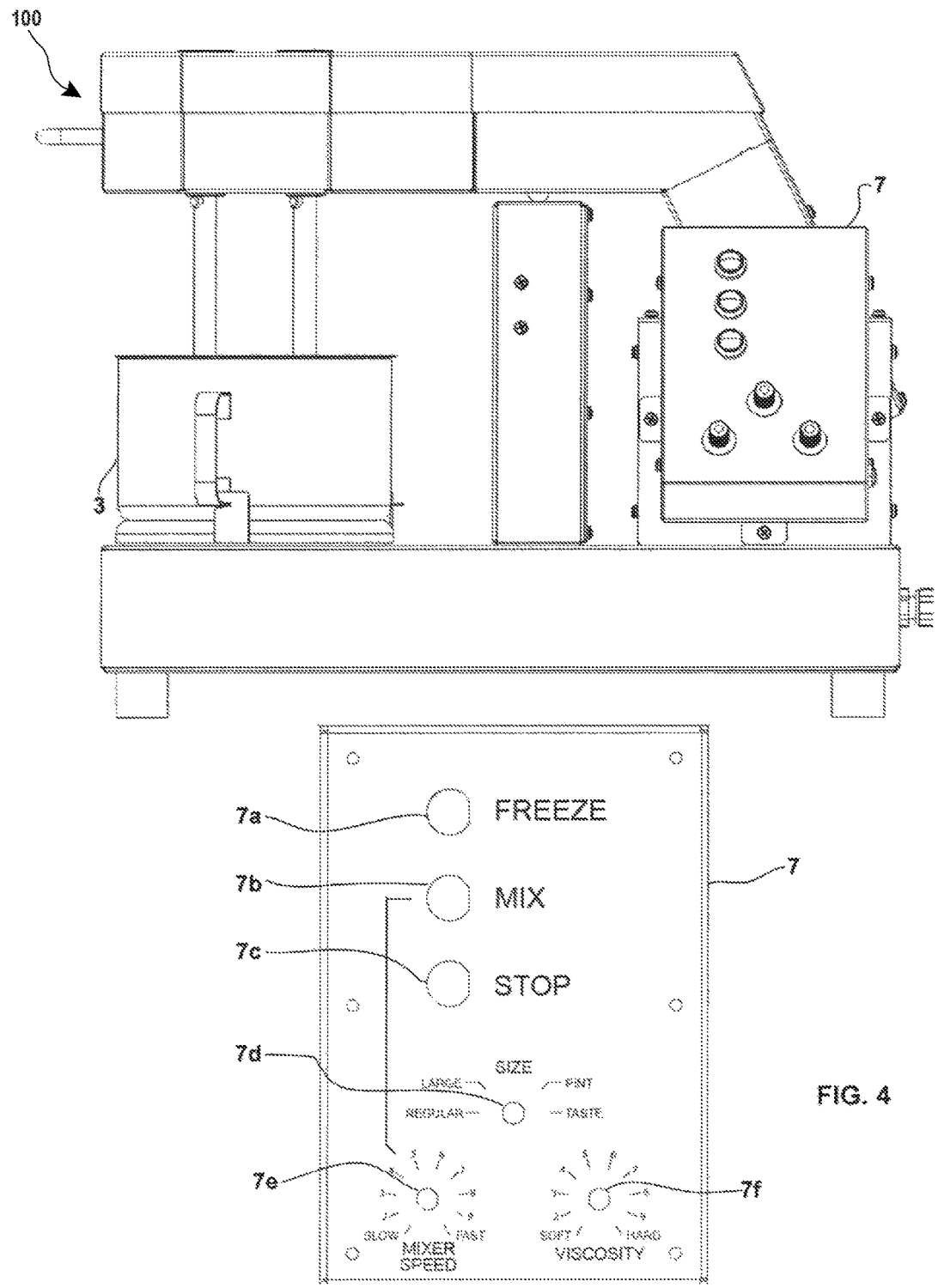
FIG. 4 illustrates a control panel, according to various embodiments of the invention.

FIG. 4 shows an exemplary embodiment of a detailed control panel 7 when this embodiment is used for preparing a frozen product using liquid nitrogen—one of many potential applications of this invention. In this example, there is a freeze button 7a (which could be removed if the embodiment was not used for frozen applications), a mix button 7b, and a stop button 7c. This example also includes a size knob 7d, which can be used to select various serving sizes (regular, large, pint, taste). This variation also includes a mixer Speed knob 7e, which ranges from slow to fast. This example also includes a viscosity knob 7f, which ranges from soft to hard. The viscosity knob 7f is configured to control the viscosity of the final product, which may be determined by measuring actual viscosity or some other parameter as discussed below with reference to FIG. 5. An interior of this variation of control panel 7 could include a printed circuit board with wiring connections. Mixer Speed knob 7e can be configured to control the speed of beaters 2 and/or container mount 4. In addition to viscosity selection, control inputs may be configured for a user to select between various recipes as some ingredient combinations and/or products require greater or lesser cooling than others. The different recipes may include different ingredient ratios and/or different total quantities of ingredients. For example, an input may be configured for selection between small, medium and large quantities (sizes) of product.

Figure 5:
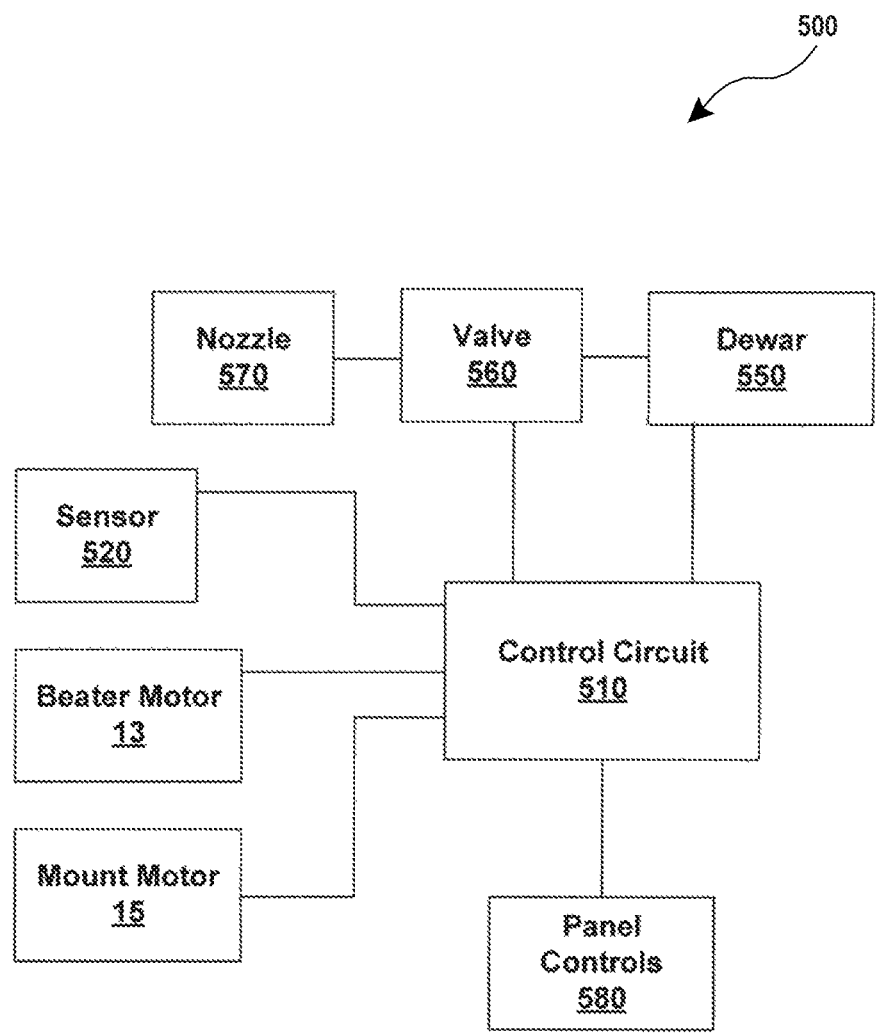
FIG. 5 illustrates a block diagram of the control panel illustrated in FIG. 4, according to various embodiments of the invention.

FIG. 5 shows an example of a block diagram 500 of a control circuit 510 and other components of the system associated with the control panel 7 shown in FIG. 4. Wiring from control circuit 510 connects to various components of the device, including to the panel controls 580, mount motor 15 and beater motor 13. For example, Control Circuit 510 may be connected to one or more valves 560 configured to control the flow of liquid nitrogen from a Dewar 550 to a Nozzle 570. The Nozzle 570 may be disposed adjacent to container 3 such that the liquid nitrogen that flows from the nozzle 570 reaches the ice cream ingredients. In some embodiments, valve 560 is optionally replaced by a scoop or other device configured for sampling a controlled amount of liquid nitrogen.e Control Circuit 510 is optionally connected to a level sensor (not shown) within Dewar 550. Beater Motor 13 is configured to rotate beaters 2. Mount motor 15 is configured to rotate container mount 4.

Sensor 520 is configured to detect properties of the frozen ingredients during the freezing process. In some embodiments, sensor 520 is configured to detect a viscosity of the ingredients. For example, sensor 520 may be configured to detect a load on beater motor 13 or mount motor 15. In this case, sensor 520 can include at least one strain sensor, current sensor or voltage sensor configured to detect the torque or power needed to drive the motor 13 or mount motor 15. In some embodiments, sensors might be used individually or in combination with others, and sensor types might include angular or linear displacement, capacitive, magnetic, or resistive. In some embodiments, sensor 520 includes a temperature measurement device, such as a thermocouple. The thermocouple can be connected to beaters 2, container 3, and/or nozzle 570. In various embodiments the thermocouple is disposed in the stream of liquid nitrogen as it leaves nozzle 570, to measure the temperature of an output pipe 1125 (see FIG. 11), and/or to measure the temperature of the ingredients as they are being mixed and cooled. In addition to the thermocouple, sensor 520 can include a metallic or non-metallic probe (e.g., a copper plate) whose temperature is changed by the liquid nitrogen and is measured by the thermocouple. Some embodiments include more than one sensor 520. The output of sensor 520 is optionally processed using circuits and/or computing instructions executed within control circuit 510, to perform various functions described herein.

In some embodiments, one or more viscous substances is/are placed in container 3. For example, if the method is being used to make a frozen dessert, such ingredients may include unfrozen ice cream or custard mix, or pureed fruit for sorbet, or yogurt, or milk or cream, or a non-dairy substitute for milk or cream. Additional ingredients/accompaniments/toppings (e.g., in the case of a frozen dessert: cookies, fresh fruit, or nuts) may also be added to the container 3 prior to or during the process of mixing (and, in this case, freezing). Substance/ingredients may either be placed into the container 3 before or after the container 3 is placed on the container mount 4.

When the mix button 7b on control panel 7 is pressed, beater transmission 11, driven by its accompanying motor 13, rotates the beaters 2, with each beater rotating in the same direction and speed of rotation as the other beater. In some embodiments, the spirals 2b of the beaters 2 move in a downward direction such that the spiral helices 2b are pushing the substance/ingredients downward into the container 3. At the same time, belt drive 10 powered by its accompanying gear-motor 15 rotates the container 3 at an asynchronous speed relative to the beaters. In some embodiments, the container 3 rotates (typically but not necessarily in the opposite direction as the collective beaters 2 and turns at such a speed with non-small integer ratios such that essentially all of the container's side is scraped by the beaters 2 (again, the beaters 2 not quite touching the side of container 3. In other embodiments the container 3 does is fixed and does not rotate. In these embodiments, motor 15 and the associated drive system elements are optional. To demonstrate the rotating container embodiment, in FIG. 3A, spiral helices 2b may move counter-clockwise, while container 3 moves clockwise. Due to the helical shape and movement of the beaters 2, in practice, the beaters 2 act to scrape the ingredients from each other's surface and to propel the ingredients down into the container 3. The interlocking configuration of the beaters 2 allows the beaters to remove frozen ingredients from each other, making the beaters 2 jointly self-cleaning.e Additionally, because the beaters 2 are designed to fit the container 3 and the container 3 is rotating at an asynchronous speed relative to the collection of beaters 2, the beaters 2 also act to scrape the ingredients off of the sides of the container 3. Due to the asynchronous movement between the collective beaters 2 and the container 3, the collective beaters 2 are, in essence, orbiting together around the interior surface of the container 3, such that most interior sides of the container 3 are scraped by the collective beaters 2. If pitch, diameter, spacing and wiring gauge are all correct, most of the surfaces are close to a scraping action.

The underlying purpose of this beater-container design is to ensure that the substance in the container 3 is evenly mixed (and, in the case of making a frozen product, frozen) throughout, that the particles/ingredients don't cluster or stick to any surface, and that all ingredients are incorporated into the mixing (and, in the case of making a frozen product, freezing) process. Effectively, this specific mixing apparatus churns a smaller ice crystal in the end product due to the constant and thorough scraping of all surfaces at all times. Additionally, the collective helical design of the beaters 2 minimizes crushing of additive by allowing their escape from between moving parts, using a wiping rather than a crushing motion at intersections. This beater-container design is especially effective for making frozen product using liquid nitrogen as the freezing agent because the formation of small ice crystals has a significant impact on the texture of the frozen product (e.g., ice cream). Some embodiments of the invention ensure the creation of an exceptionally high quality frozen novelty product—the formation of exceptionally small ice crystals—because of the even distribution of the ingredients, the constant scraping of ingredients off surfaces, and the downward motion of the spirals. Note that in some embodiments the container 3 is moved while the beater(s) 2 is(are) stationary.

The control circuit 510 can be programmed to run the motors for a number of seconds every time the mix button is pressed and then to stop running the motors after that time is up. Alternatively, the control circuit 510 can be programmed to run the motors continuously, in which case Stop button 7c can be pressed to halt the motors. There may or may not be a mixer speed knob 7e, which moves the beaters 2 and/or the container 3 faster and slower depending on its position. Additionally, if desired, the control circuit 510 can be programmed to read Size knob 7d (such that the device mixes for a longer time depending on the amount of ingredients placed in the container); Viscosity knob 7f (such that the device mixes until the desired viscosity has been reached), and/or a recipe knob (not shown) to select between different recipes. The knob inputs illustrated in may be replaced by digital inputs such as a computer touchscreen interface, membrane switches, a graphical user interface, and/or the like.

Embodiments may or may not have viscosity measurement capabilities, and some embodiments can provide control to the user for example via the viscosity knob 7f on the control panel 7. In other embodiments the knob 7f can be omitted and viscosity can be controlled programmatically, for example through a closed-loop system having identified viscosity targets, mixing instructions, and feedback from one or more sensors within or proximate to the mixing bowl, beater(s), or beater motor(s) providing signals representative of current mixture viscosity. When this capability is included, the entire device can be integrated and the entire mixing (and, in the case of making a frozen product, freezing) process can be completely automated, without requiring the watchful eye of a machine operator. For example, in some embodiments, control circuit 510 is programmed to read the torque of either the beater motor 13 or the container motor (mount motor) 15 and control the dosing of coolant depending on the measured torque and the viscosity knob 7f setting. Generally, the beater torque has a lot of noise in it, so in one approach is to use the measurement of the container motor torque and to use a small motor, which can give a good indicator of how viscous the substance is. Because the collective beaters 2 optionally have asynchronous movement relative to the container 3, the motors driving the container 3 and beaters 2 are, in essence, working against each other to some degree. For instance, in the aforementioned example, the container 3 is moving in the opposite direction as the collective beaters 2 such that the collective beaters 2 are working "against" the container 3. As such, when the substance or ingredients is/are thickening, the motors have to work harder and harder. By setting the desired viscosity, the operator is indicating how hard the motor should work before stopping and, in essence, before the substance/product is done and ready for removal from the container (or ready for the next step in its mixing process). The control circuit 510 can be programmed to take into account momentary increases in torque as a result of the beaters 2 working through chunks (e.g., in the case of making a frozen dessert, these chunks may be nuts or chocolate chips). For instance, logic on control circuit 510 can be set to shut down the system (and stop coolant introduction) when the system exceeds a certain torque for a number of seconds in a row. As such, momentary increases in torque are ignored. This logic can include hardware, firmware and/or software stored on a computer readable medium.

Overview of Example Dosing Systems and Techniques

In the case of making a frozen product using liquid nitrogen, liquid nitrogen can either be added manually or through a semi-automatic or automatic dosing system, for example, a semi-automatic or automatic dosing system. The dosing system may be connected to a liquid nitrogen supply—an example of this supply is shown as Dewar 550 in FIG. 5. If liquid nitrogen is added manually (for example, by a user actuating a valve or pressing a button that actuates a valve), then the freeze button 7a on control panel 7 acts the same as mix button 7b. In this case, there need only be one button or lever, in essence Mix/Freeze, which activates the device. Note that the mix button 7b is optional. Mixing can occur manually outside of the container 3.

Some embodiments of the dosing system may include the following components: a manifold for the delivery of liquid nitrogen, a vessel for storing liquid nitrogen at atmospheric pressure, and a mechanism for conveying liquid nitrogen from the vessel to the container with ingredients to be frozen. The vessel may include the means for maintaining a specified amount of liquid nitrogen. Towards that end, some embodiments of the vessel can include a capacitive level sensor with an amplifier, an actuated valve on the inlet to the vessel, and a microcontroller connected to circuitry and running software to facilitate the reception of the signal from the capacitive level sensor, and to control the opening and closing of the valve on the inlet to the vessel. Some embodiments of a mechanism for conveying liquid nitrogen from the vessel to the container with ingredients to be frozen may include one or more cups to scoop liquid nitrogen from the vessel and in controlled amounts pour liquid nitrogen into funnels that would channel the liquid nitrogen to an outlet tube. This outlet tube may have an inlet located inside of the vessel above the liquid level, and an outlet located above the container (e.g., container 3 in FIG. 11) with the ingredients to be frozen. In this embodiment, the cups would be allowed to swivel, and they would be raised and lowered vertically by means of a straight round shaft connected to a car (also referred to herein as a "carrier assembly") on a vertically oriented rail. The car may be raised and lowered by a stepper motor coupled with a gear and chain drive transmission to the car. In some embodiments, dosing system is connected to a mixing machine and communicates with a mixing machine to facilitate automatic control of the freezing process based on viscosity, temperature, volume, or other properties of the ingredients to be frozen.

The liquid nitrogen, when added manually or through the integrated dosing system, can be added in one bulk pouring or in multiple releases over a period of time. Typical dispensing times are under two minutes for a 4-10 ounce batch size.

Figure 6:
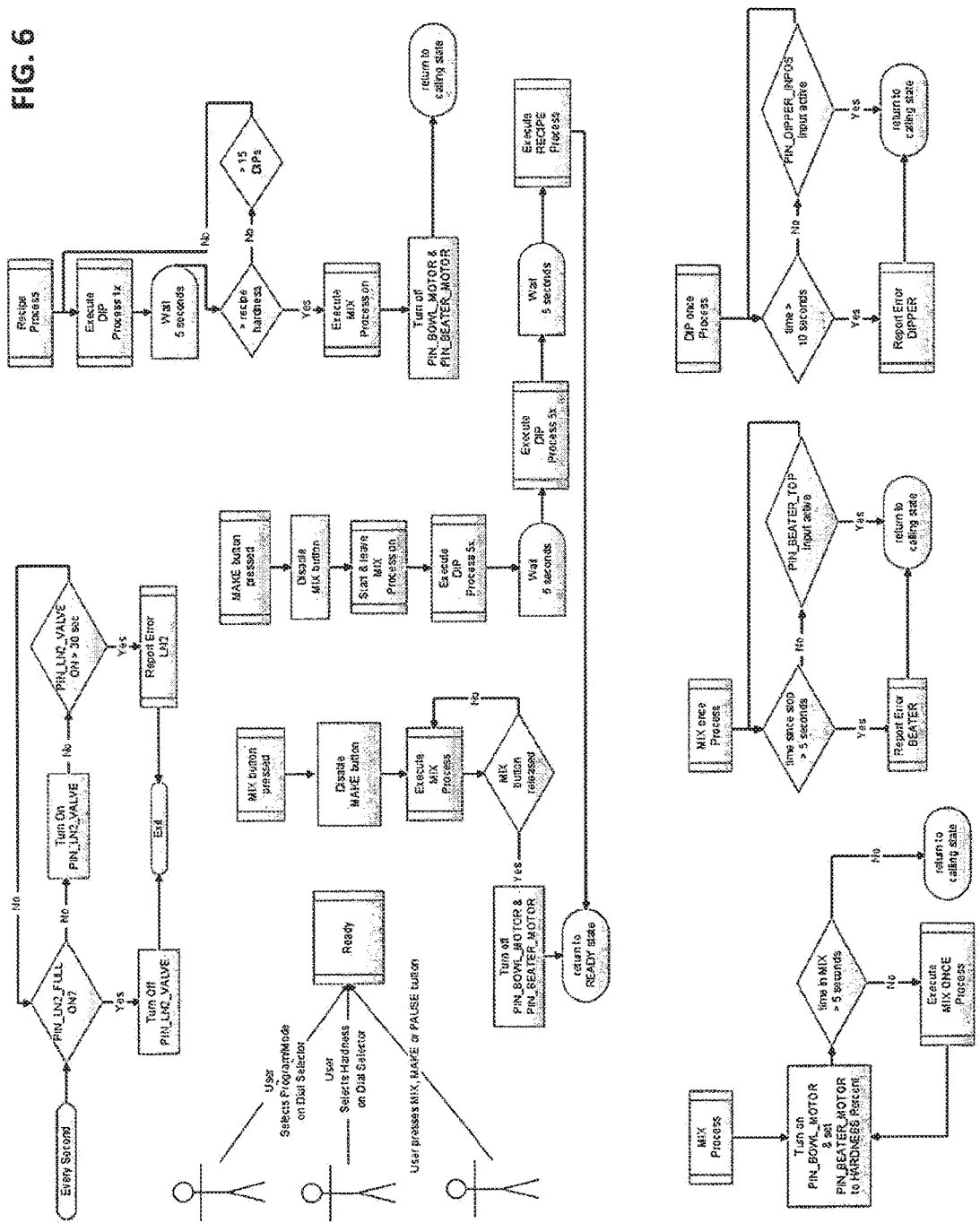
FIG. 6 illustrates a flow chart of an example algorithm for dispensing of liquid nitrogen, according to various embodiments of the invention.

FIG. 6 illustrates several methods that may be performed using control circuit 510. These include a) determining at regular intervals if more or less liquid nitrogen should be added and turning on or off valve 560 accordingly; b) monitoring an amount of cooling that has been provided to the ingredients and turning on or off valve 560 accordingly; c) detecting which of panel controls 580 have been activated; starting and stopping beater motor 13 and/or mount motor 15; and d) monitoring viscosity of the frozen ingredients and turning on or off valve 560 accordingly.

Figure 7:
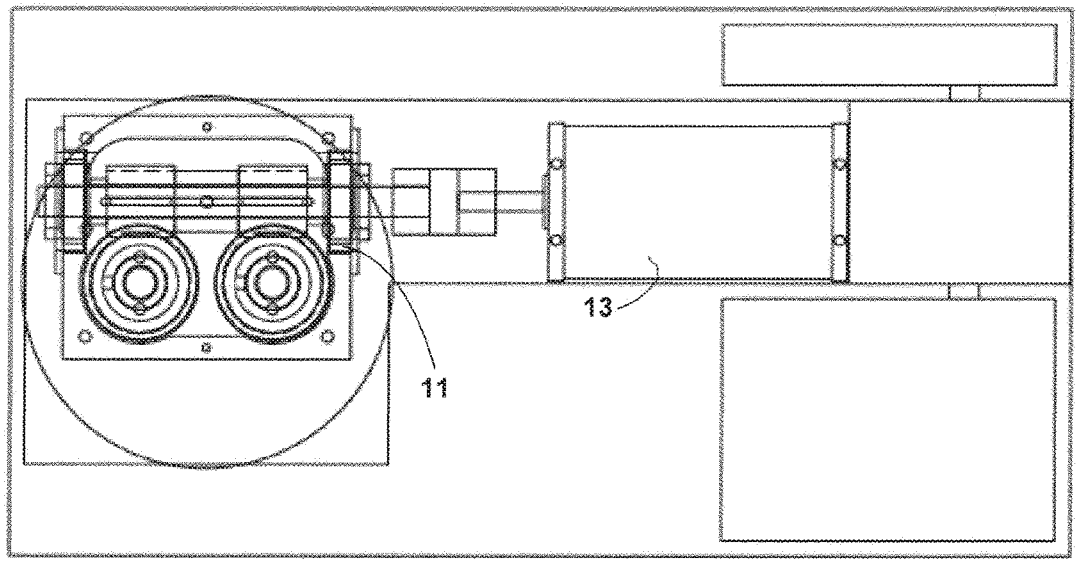
FIG. 7 illustrates the beater drive system, according to various embodiments of the invention.
Figure 7:
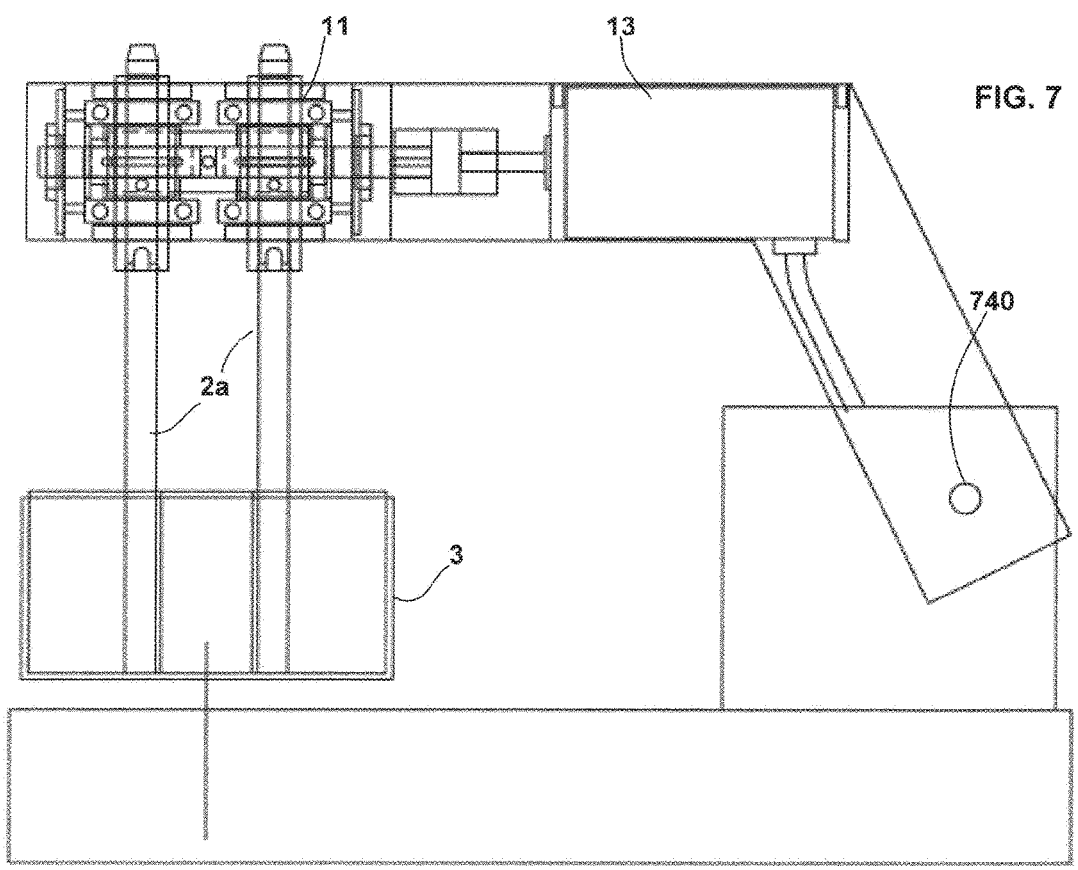

FIG. 7 shows the beater drive system, according to various embodiments of the invention. The beater drive system includes a beater motor 13, mechanically coupled to transmission 11 and drive shafts 2a configured to turn the beaters 2. The beater motor 13 optionally includes sensor 520 configured to measure motor speed or current drawn by one or more of the motors 13 or 15. The beater drive system may include a hinge 740 configured such that the beaters 2 can be lifted from the container 3. Hinge 740 is optionally motorized and controlled by control circuit 510. In alternative embodiments, the same motor is configured to rotate any combination of beaters 2, hinge 740, and/or container 3. The beater drive system is optionally configured to rotate beaters 2 in the same direction, and optionally configured to rotate at least one of beaters 2 in a direction opposite the rotation of container 3. Beater motor 13 is optionally disposed in alternative positions.

Figure 8A:
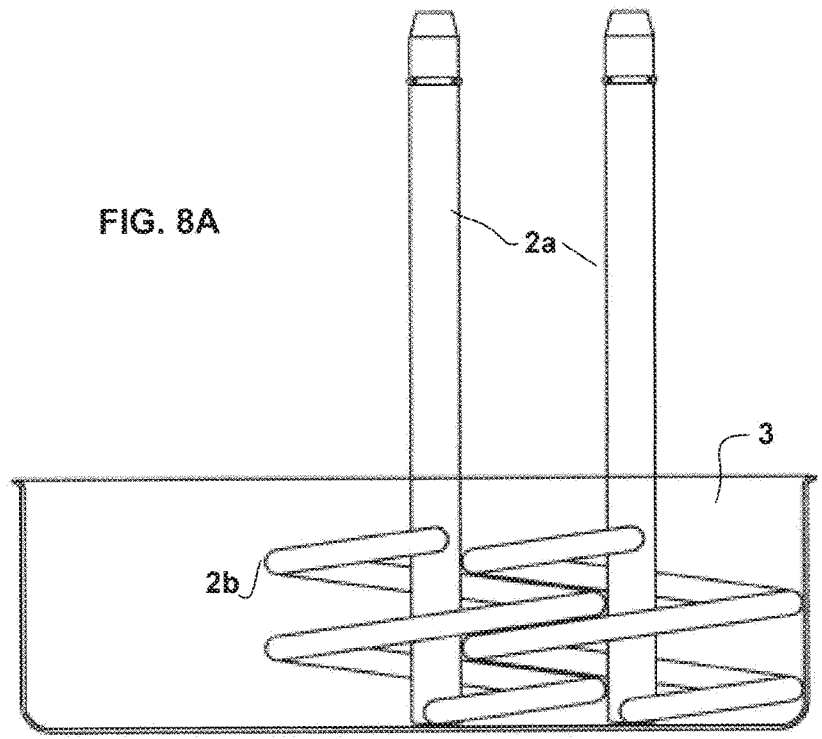
Figure 8B:
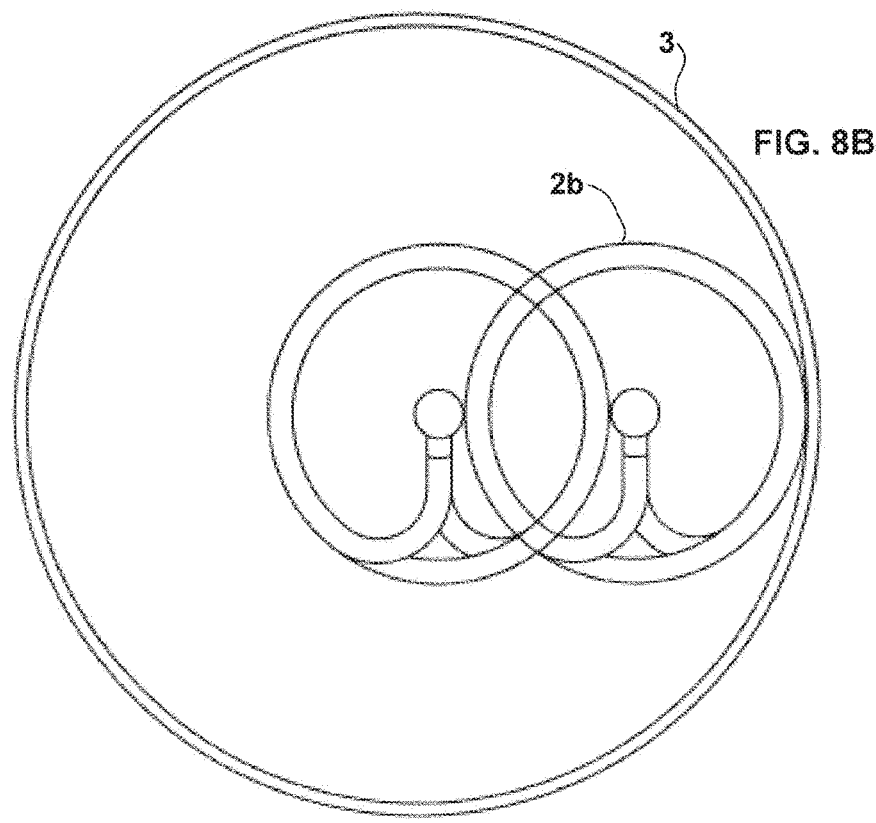

FIGS. 8A and 8B show examples of helical beaters 2 in a container 3, according to various embodiments of the invention, in these examples the helical beaters 2 are disposed such that one of the beaters 2 is closer to a side surface 810 of the container 3 relative to a second of the beaters 2. In various embodiments the distance between the closer beater 2 and side surface 810 can be less than $\frac{1}{4}$, $\frac{3}{16}^{th}$, $\frac{1}{8}^{th}$, or $\frac{1}{16}^{th}$, or between 0.010 inches and 0.200 inches. In a preferred embodiment, the distance between the closer beater 2 and side surface 810 can be 0.064 inches to 0.081 inches. However, in some embodiments the closer beater is disposed such that it does not touch side surface 810. Similar positioning between side surface 810 and beaters may be found in embodiments wherein beaters 2 are symmetrically disposed within container 3. Either of these positions allows beaters 2 to clean frozen product from side surface 810. If the beaters 2 rotate in opposite directions, then that beater closest to side surface 810 is rotated in a direction counter to side surface 810. Otherwise, the rotations are such that at least one of beaters 2 is disposed next to side surface 810 and rotates in a direction opposite to the direction side surface 810 is rotated.

FIG. 8C illustrates one example of a top view of beaters 2 and container 3. The distances are shown in inches and degrees, and are meant to be non-limiting examples.

Figure 9:
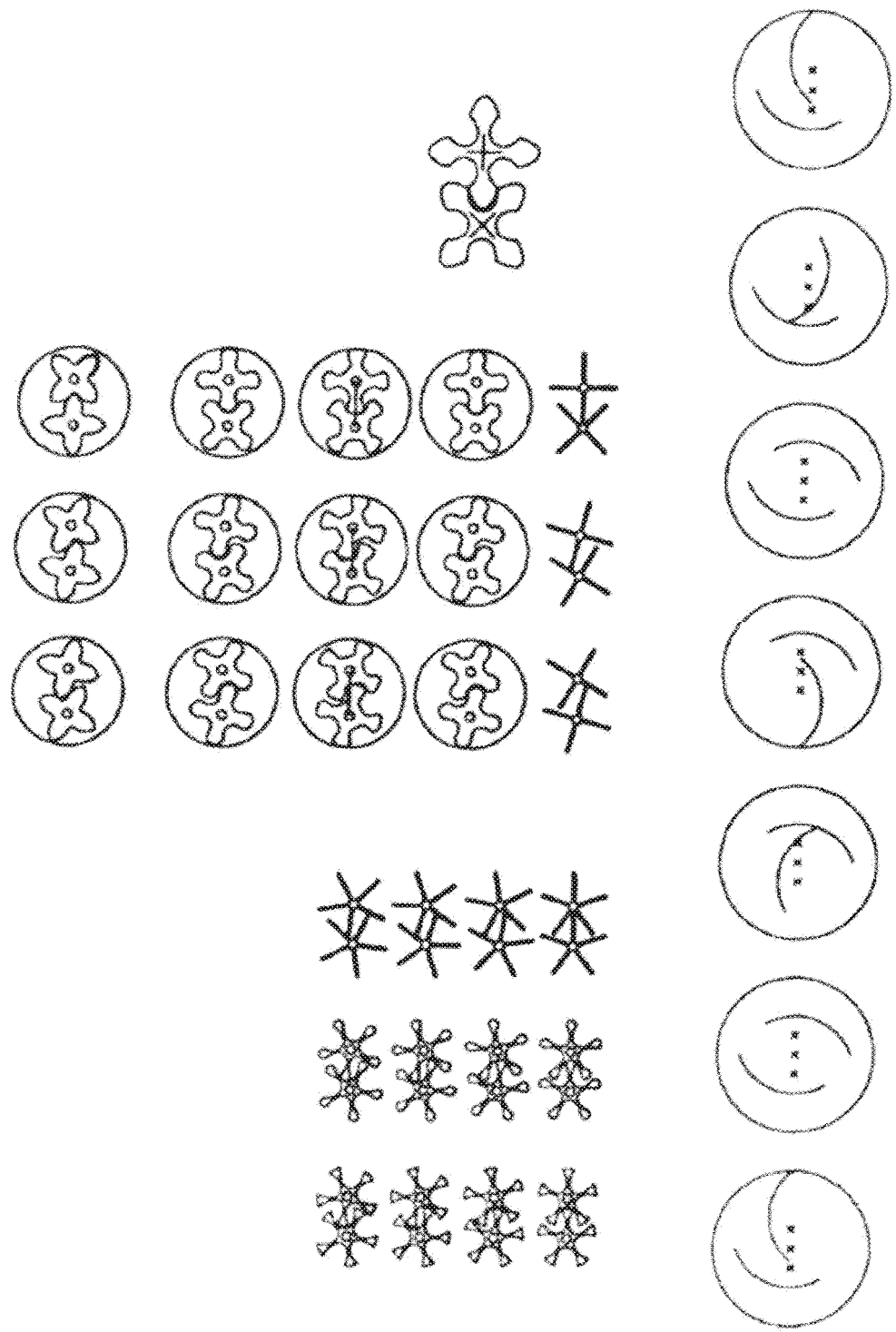
FIG. 9 illustrates alternative beater/agitator designs, according to various embodiments of the invention.

FIG. 9 illustrates various alternative beater 2/agitator designs, according to various embodiments of the invention. One feature common to most of these designs is that they are self-cleaning. In each example the beaters 2 rotate so as to remove frozen product from each other and/or from surfaces of the container 3.

Figure 10:
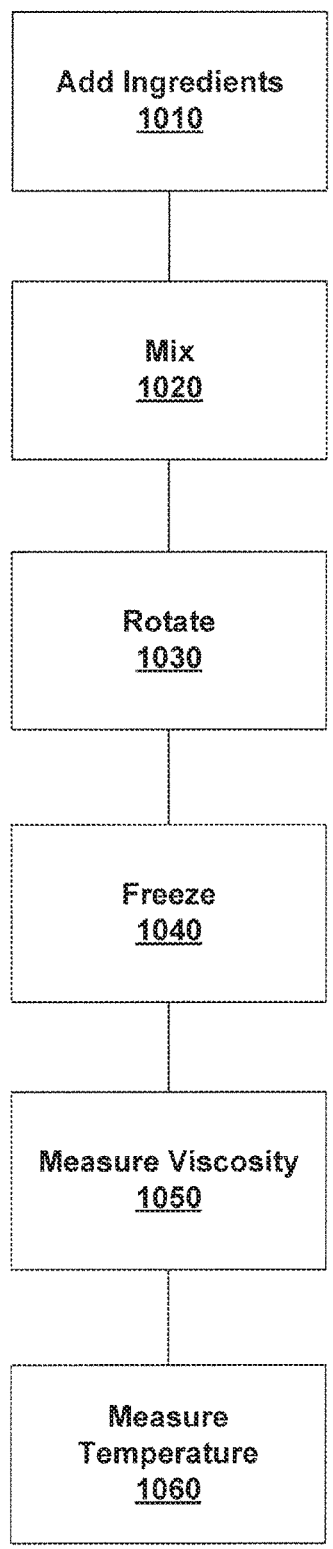
FIG. 10 illustrates a method of making frozen ice cream, according to various embodiments of the invention.

FIG. 10 illustrates a method of making a frozen confection, according to various embodiments of the invention. In an add ingredients step 1010 ice cream ingredients are added to container 3. As described herein the ingredients can include a wide variety of food stuffs including cream, yogurt, sugar, flavoring, and the like. The addition is optionally automated.

In a mix step 1020 the ingredients are mixed using two or more interlocking beaters 2. In various embodiments, adjacent surfaces of the beaters 2 are disposed to pass within less than $\frac{1}{4}$, $\frac{3}{16}^{th}$, $\frac{1}{8}^{th}$, or $\frac{1}{16}^{th}$ inches of each other, or between 0.010 inches and 0.200 inches of each other. In a preferred embodiment, the adjacent surfaces of the beaters 2 are disposed to pass within 0.064 inches to 0.081 inches of each other. Typically, the beaters 2 do not touch each other, though some clipping (contact) can occur during use. The beaters 2 may be constructed with a hard material (for example, stainless steel, ceramic, aluminum) and have smooth surfaces to prevent or mitigate wear or breakage should incidental contact occur during mixing. By having surfaces that pass within these distances from one another, the beaters operate to be self-cleaning or self-wiping, e.g., they scrape, wipe, or clean frozen (ice cream) product from each other. Mixing occurs by rotating the interlocking beaters 2.

In an optional rotate step 1030, the container 3 is rotated. Typically this rotation occurs in a direction that is opposite the rotational direction of a member of the beaters 2 that is in close proximity to a side of the container. For example, the member of the beaters 2 that is closest to a side surface of the container. The container 3 can be rotated using the same or a different motor than is used to rotate the beaters 2.

In a freezing step 1040, a coolant is added to the ingredients in the container 3. The coolant is typically a liquefied gas such as liquid nitrogen, and is delivered in a controlled manner. For example, in some embodiment a controlled amount (volume or mass) of coolant is added. In some embodiments, the coolant is added for a specific length of time, until a measured viscosity of the ingredients is achieved, and/or until a desired temperature drop is achieved. Control can be achieved by opening and closing a valve or by collecting a specific amount of fluid from a reservoir.

The freezing step 1040 is optionally performed in parallel with a measure viscosity step 1050. In measure viscosity step 1050 the viscosity of the ingredients is measured using sensor 520 as the coolant is added. As discussed elsewhere herein, viscosity can be measured by monitoring current consumed by the motor 13 or 15, monitoring the speed of motor 13 or 15, and/or the like. If the viscosity is measured, then the delivery of the coolant to the ingredients can be controlled responsive to this measurement.

The freezing step 1040 is optionally performed in parallel with a measure temperature step 1060. In measure temperature step 1060 the temperature of the ingredients is measured using and embodiment of sensor 520 as the coolant is added. These embodiments of sensor 520 can include, for example, a thermocouple or an optical sensor. The measured temperature could be that of the ingredients themselves, part of beaters 2, part of container 3, part of a nozzle used to deliver the coolant, or of a metallic (or non-metallic) object placed in the stream of the coolant. If the temperature is measured then the delivery of the coolant to the ingredients can be controlled responsive to this measurement. Optionally, both temperature and viscosity are measured using separate embodiments of sensor 520.

Figure 11:
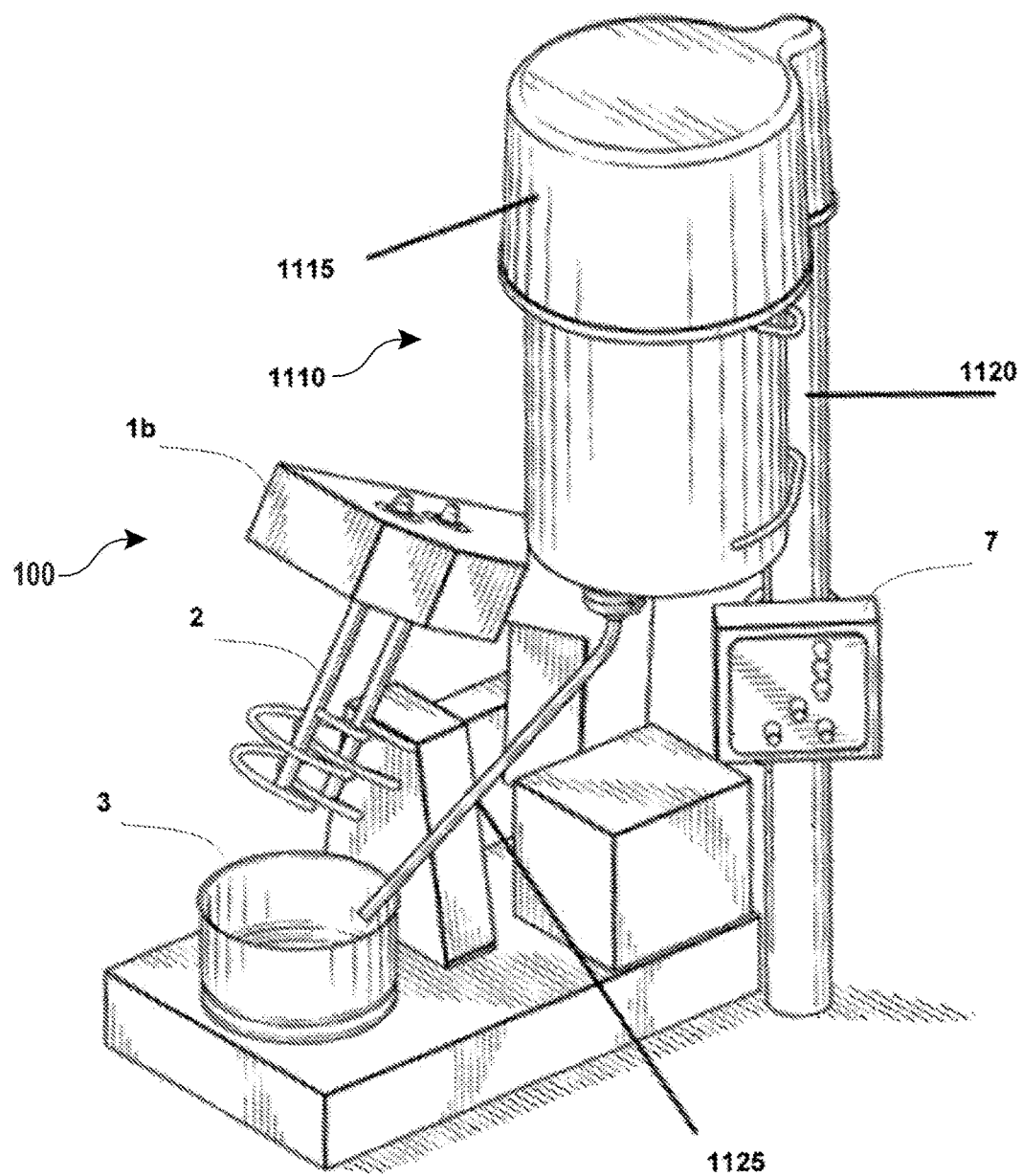
FIG. 11 illustrates the ice cream production system of FIG. 1 further comprising a liquid nitrogen dosing system, according to various embodiments of the invention.

FIG. 11 illustrates an example of an ice cream production system that includes the mixing system 100 illustrated in FIG. 1. The ice cream production system also includes a liquid nitrogen dosing system 1110, according to various embodiments of the invention. The liquid nitrogen dosing system 1110 is optionally controlled via control panel 7 and/or Control Circuit 510 (FIG. 5) and is configured to provide reproducible doses of liquid nitrogen or another cryogenic liquid to container 3 via an output pipe 1125. The liquid nitrogen dosing system 1110 may be manually filled by, or may be connected to, a pressurized reservoir (not shown) of liquid nitrogen. To provide reproducible doses of liquid nitrogen, liquid nitrogen dosing system 1110 is configured to store a volume of liquid nitrogen and to release one or more doses of the liquid nitrogen to container 3 via the output pipe 1125. The dose of the liquid nitrogen is reproducible, in part, because by sampling from the bottom of a container holding the liquid nitrogen, the dose includes primarily liquid rather than gas phase nitrogen. Liquid nitrogen dosing system 1110 optionally includes embodiments of Nozzle 570, Valve 560 and Dewar 550 (FIG. 5). The liquid nitrogen dosing system 1110 may include a cover 1115 configured to seal an interior of the liquid nitrogen dosing system 1110 from the ambient atmosphere. The liquid nitrogen dosing system 1110 also may include support structure 1120.

Figure 12:
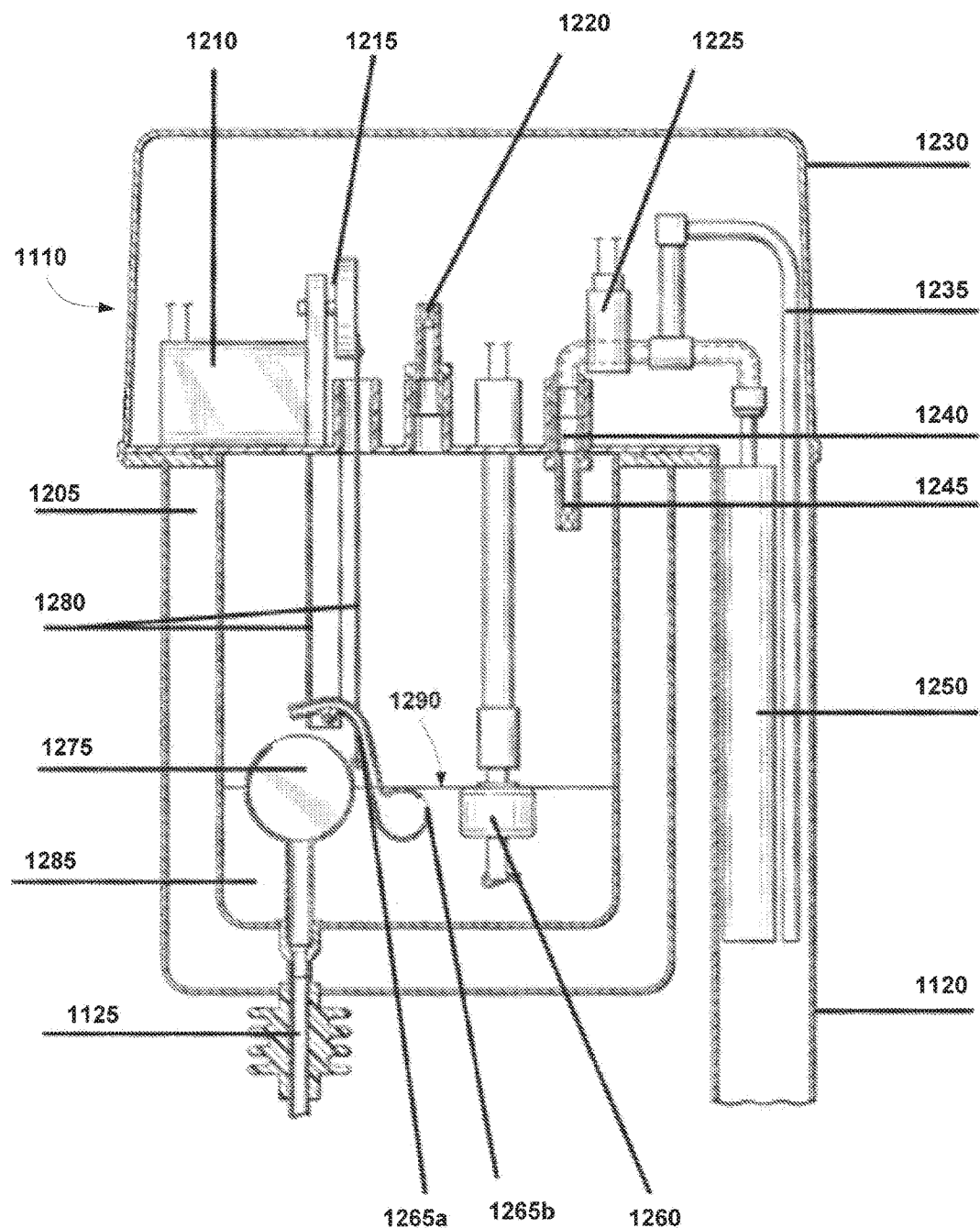
FIG. 12 illustrates a cross-sectional view of a liquid nitrogen dosing system, according to various embodiments of the invention.

FIG. 12 illustrates a cross-sectional view of an example of a liquid nitrogen dosing system 1110, which includes various components one or more of which may be included in various embodiments of a liquid nitrogen dosing system 1110. The liquid nitrogen dosing system 1110 illustrated in FIG. 12 includes a container with vacuum jacketed walls 1205 and may include a relief vent 1220 (optional). The walls 1205 may form a reservoir 1285 configured to contain cryogenic liquid. In some embodiments, the liquid nitrogen dosing system 1110 includes an actuator 1210 connected to a lifting mechanism 1215 (e.g. a gear, a belt pulley, a chain sprocket, a cam or lever arm). In some embodiments the actuator 1210 can be manually actuated, or it can be connected to a control system (e.g., a button or switch) that is configured to run the lifting mechanism 1215 through one or more cycles of lifting. In some embodiments, the actuator 1210 maybe connected to a more complex control system, for example, control circuit 510 (FIG. 5) and/or control panel 7 (FIG. 4).

Extending from the lifting mechanism 1215 is a member (e.g., a wire, beam or another structural connector) 1280 that attaches to a dipper mechanism 1265a. The member 1280 is provided as one example of a connector, and other connecting components that can lift the dipper mechanism 1265a, including shafts, beams, brackets, cams, and the like. One side of the dipper mechanism 1265a, referred to as the "head" of the dipper mechanism 1265a, extends down into the reservoir 1285 that holds cryogenic liquid. In some embodiments, the head of the dipper mechanism 1265a has a scoop 1265b of a certain size such that, when the scoop 1265b contains cryogenic liquid and the dipper mechanism 1265a is raised by the lifting mechanism 1215, a controlled quantity of cryogenic liquid is transported to a delivery port (or funnel) 1275. The delivery port 1275 may be attached to the interior of the liquid nitrogen dosing system 1110. The top of the delivery port or funnel 1275 may be disposed above a bottom of reservoir 1285 such that the top of the funnel 1275 is above a normal operational liquid level 1290 of the cryogenic liquid contained in the reservoir 1285. The funnel 1275 is connected to output pipe 1125 such that liquid nitrogen introduced into the funnel 1275 flows through the output pipe 1125 to the container 3 (FIG. 12), for example, by action of gravity.

In some embodiments, the interior of liquid nitrogen dosing system 1110 is at or near atmospheric pressure. As such, the flow of liquid nitrogen into container 3 is gravity fed and any excess pressure within liquid nitrogen dosing system 1110 does not cause significant variation in the volume of liquid nitrogen provided per dose. Note that when not filled with liquid nitrogen, funnel 1275 may be open to both the atmosphere (adjacent to container 3) and the volume within liquid nitrogen dosing system 1110 that contains gas phase (evaporated) nitrogen. As a result, the evaporation of liquid phase nitrogen within liquid nitrogen dosing system 1110 may cause a net flow of cold nitrogen gas out of reservoir 1285 through funnel 1275 and output pipe 1125. This results in precooling and/or purging of output pipe 1125, prior to delivery of liquid doses of nitrogen.

The liquid nitrogen dosing system 1110 may be filled with liquid nitrogen (and the liquid level 1290 approximately maintained) either manually or automatically. In those embodiments that include automatic filling, the liquid nitrogen dosing system 1110 may include a sensor 1260 configured to detect the level or quantity of liquid nitrogen in reservoir 1285. In some embodiments, the sensor 1260 includes a float level sensor that extends down from the top of liquid nitrogen dosing system 1110. Other level sensing means can be used in other embodiments, for example, other mechanical sensors, capacitive sensors, thermal sensors, and/or optical sensors. In some embodiments, two or more sensors are used.

In some embodiments, sensor 1260 includes a mass sensor, scale or other mechanism configured to measure a changing quantity of cryogenic liquid within the liquid nitrogen dosing system 1110. Sensor 1260 can be mechanical or electronic. In either case, sensor 1260 may be configured to control an actuating valve 1225.

In embodiments including an electronic sensor 1260, sensor 1260 may be configured to communicate an electronic signal via a circuit, for example, Control circuit 510, to actuating valve 1225.

Still referring to FIG. 12, the actuating valve 1225 may be coupled to a cryogenic liquid delivery pipe 1250 external to the vacuum jacketed walls 1205. In some embodiments, delivery pipe 1250 is configured to transfer liquid nitrogen from an external (liquid nitrogen) supply tank (not shown). The delivery pipe 1250 and the external supply tank are optionally pressurized such that when actuating valve 1225 is open liquid nitrogen flows into reservoir 1285. Optionally, a diffuser 1245 is used to minimize the splash of the cryogenic liquid as it enters the reservoir 1285. The diffuser 1245 may be attached at an end 1240 of the delivery pipe 1250 that is inserted or located near reservoir 1285 an is in fluid communication with reservoir 1285. As liquid nitrogen is transferred from the delivery pipe 1250 it collects in the reservoir 1285.

Control circuit 510 (FIG. 5) is optionally configured to control actuator 1210 and actuating valve 1225. This control can be, for example, in response to a predetermined dosing algorithm, to a batch size, to a desired viscosity, to a temperature measurement, and/or to an identity of the ingredients being mixed, and/or the like.

In some embodiments, as liquid nitrogen flows into reservoir 1285 from the delivery pipe 1250, a sensing mechanism (for example, sensor 1260) is used to sense the increased quantity of cryogenic liquid within reservoir 1285. The sensing mechanism can produce a signal that indicates the reservoir 1285 is at capacity and/or that the reservoir 1285 requires more cryogenic liquid in order to provide repeatable doses of cryogenic liquid. A computerized control system (e.g., Control Circuit 510) can be used to take the signal from the sensing mechanism 1260, interpret this signal, and then send a signal to close or shut-off the actuating valve 1225 when the reservoir 1285 reaches the maximum desired quantity of cryogenic liquid. Whenever the sensing mechanism 1260 indicates to the control system that the liquid level 1290 within reservoir 1285 of cryogenic liquid has slipped below its minimum level, the control system opens the actuating valve 1225 to fill the reservoir 1285 again, until the desired quantity of cryogenic liquid is reached. In the case of the embodiment shown in FIG. 12, the desired liquid level 1290 is in the range wherein the liquid level 1290 is beneath the opening of the delivery funnel 1275 but above a lowest position of the scoop 1256*b* in the head of the dipper mechanism 1265*a*.

The components of liquid nitrogen dosing system 1110 illustrated in FIG. 12 optionally have a protective cover 1230. Similarly, wiring for the actuating valve 1225 and/or wiring for the actuator 1210 that moves the lifting mechanism 1215, and the cryogenic liquid delivery pipe 1250 (if present) may be encased in another pipe/covering 1120 such that the unit is smooth and cleanable from the outside.

In some embodiments, to dispense cryogenic liquid to the container from the reservoir 1285, the actuator 1210 (which may be actuated manually, by a control switch/lever/system, or by a computerized control system) activates the lifting mechanism 1215. The lifting mechanism 1215 pulls the wire/connector 1280, which raises the scoop 1265*b*. The cryogenic liquid that has collected in the scoop 1265*b* is then dispensed into the delivery funnel 1275. The dispensed dose of cryogenic liquid then exits the reservoir 1285 through the output pipe 1125. One of ordinary skill in the art will appreciate that this system is scalable—e.g., the reservoir 1285, the dipper mechanism 1265*a*, the scoop 1265*b*, the delivery funnel 1275, etc. can be built to whatever size is preferable for the application.

Figures 13A, 13B:
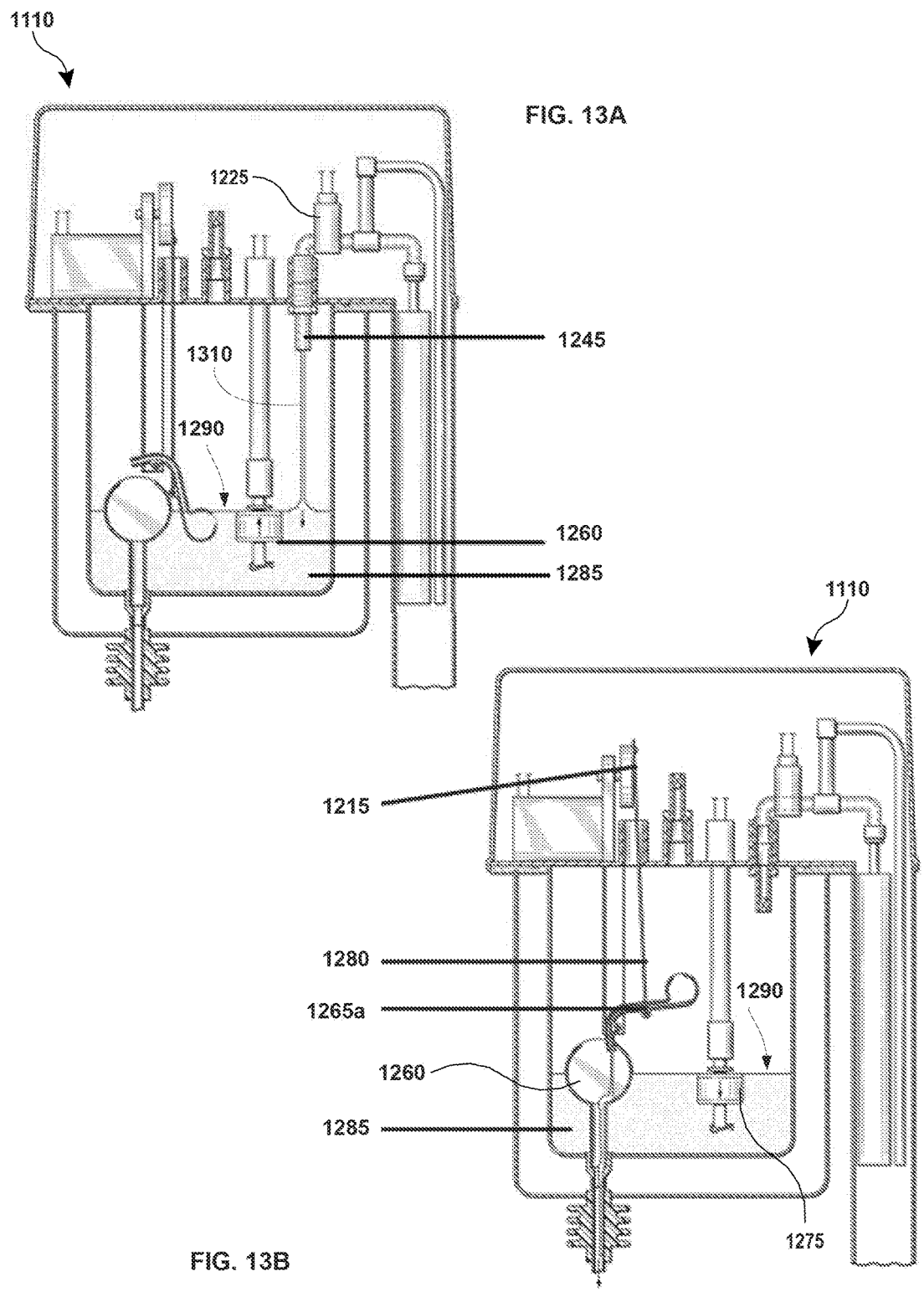
FIGS. 13A and 13B illustrate the embodiments of a liquid nitrogen dosing system illustrated in FIG. 12 at two steps in a dosing process, according to various embodiments of the invention.

FIGS. 13A and 13B illustrate the embodiments of liquid nitrogen dosing system 1110 illustrated in FIG. 12 at two steps in a dosing process. FIG. 13A shows a stream 1310 of cryogenic liquid (e.g. liquid nitrogen) coming through the diffuser 1245, as controlled by actuating valve 1225. As a result of stream 1310 entering the reservoir 1285, the sensing mechanism 1260, which in this case is a float level sensor, senses that the level of cryogenic liquid in the reservoir 1285 has gone up. FIG. 13B shows the dipper mechanism 1265*a* being lifted up and above the liquid level 1290 by the wire/connector 1280 being pulled by the lifting mechanism 1215. As a result, the dipper mechanism 1265*a* transfers a portion of cryogenic liquid from the reservoir 1285 to the funnel 1275. The sensing mechanism 1260 senses a resulting drop in the liquid level 1290. If the sensing mechanism 1260 senses that the liquid level 1290 has fallen below a predetermined threshold, then further cryogenic liquid is added to the reservoir 1285 as illustrated in FIG. 13A.

Figure 14:
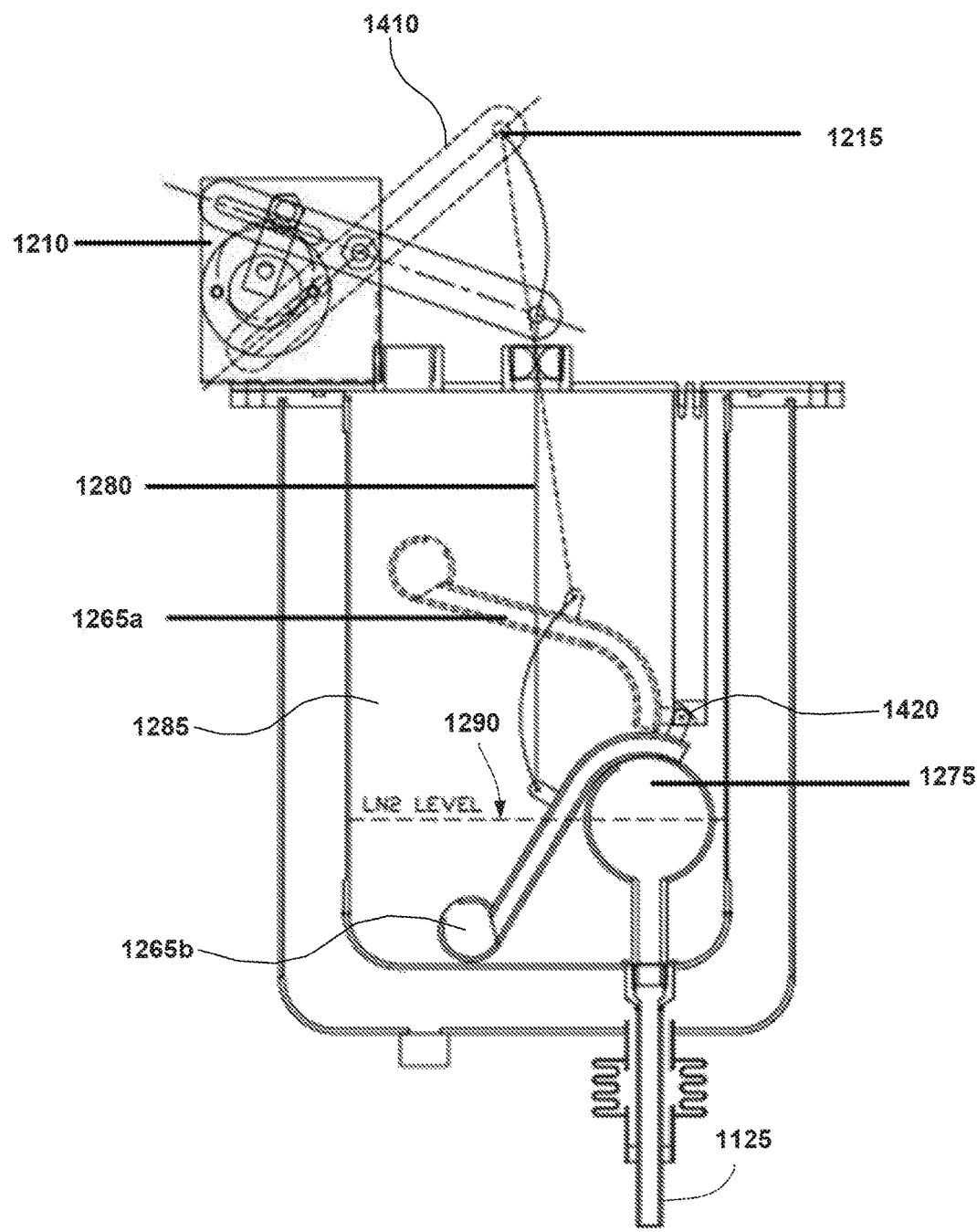
FIG. 14 illustrates an embodiment of a lifting mechanism, according to various embodiments of the invention.

FIG. 14 illustrates an embodiment of the lifting mechanism 1215 and dipper mechanism 1265*a*. In some embodiments, the lifting mechanism 1215 includes a lever arm 1410. The lever arm 1410 is connected to actuator 1210. When actuated, the lever arm 1410 pulls up the wire/connector 1280, which lifts the dipper mechanism 1265*a*.

The lifting of the dipper mechanism 1265a results in the transport of a dose of cryogenic liquid from the reservoir 1285 to the delivery funnel 1275. In some embodiments, the dipper mechanism 1265a includes a pivot point 1420 whereby the dipper mechanism pivots as it is raised by the lifting mechanism 1215. For instance, the dipper mechanism 1265a may be pivotally connected to a fixed structure within the reservoir 1285. In some embodiments, the dipper mechanism 1265a forms a hollow cylinder or tube that is open on each end, such that, when the dipper mechanism 1265a pivots, cryogenic liquid can flow from scoop 1265b through the hollow cylinder or tube formed by the dipper mechanism 1265a (dipper "tail") and into the delivery funnel 1275.

FIGS. 15A-G illustrate alternative embodiments of liquid nitrogen dosing system 1110 including different structures for delivering cryogenic liquid from the bottom of liquid nitrogen dosing system 1110. In some of the illustrated embodiments, actuating valve 1225 is above the cryogenic liquid to minimize heat transfer and allow for easier cleaning. Note that liquid nitrogen introduction elements such as sensor 1260 and actuating valve 1225 are not shown in these figures for clarity.

Figure 15A:
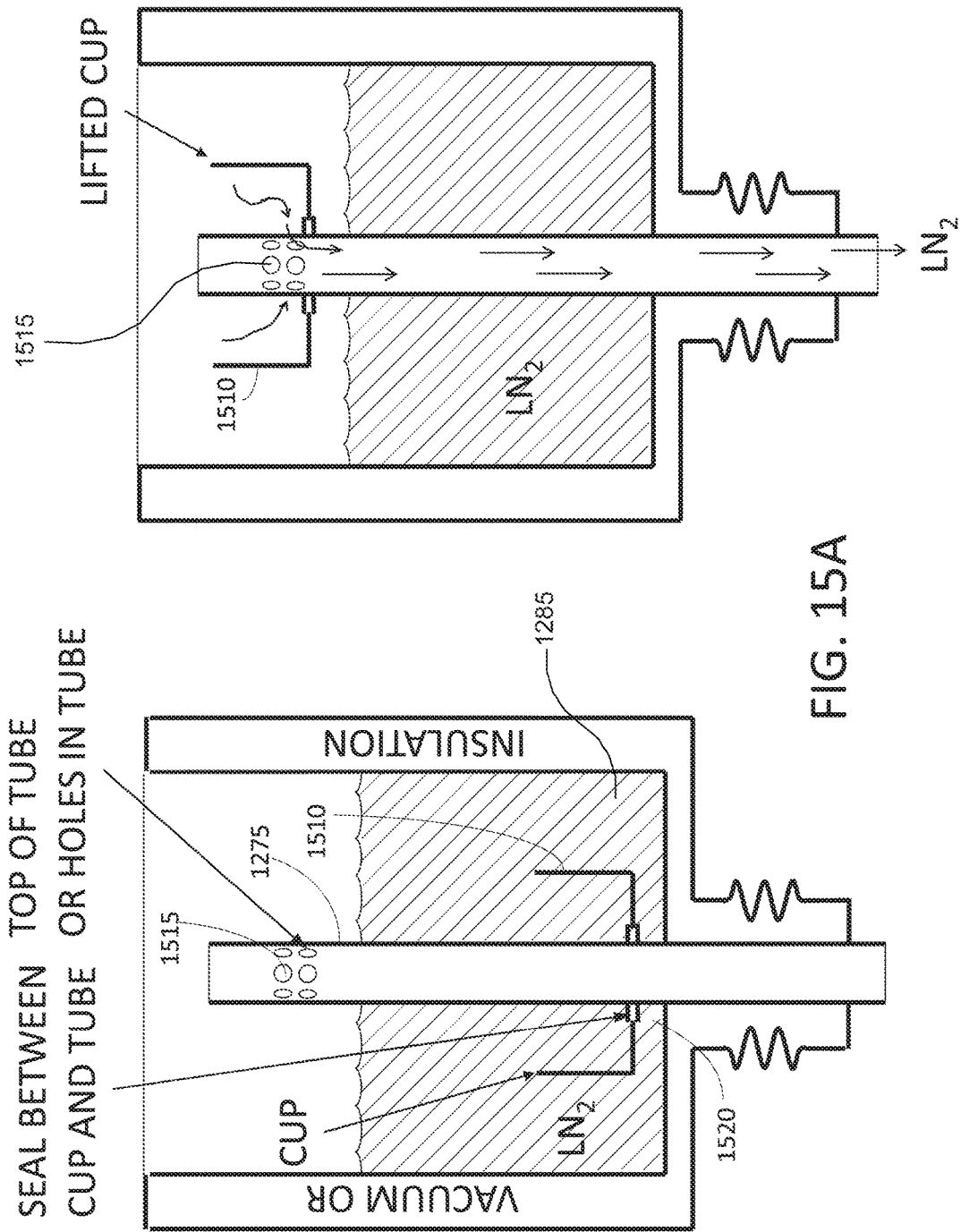
FIGS. 15A-15G illustrate alternative embodiments of a liquid nitrogen dosing system.
Figure 15B:
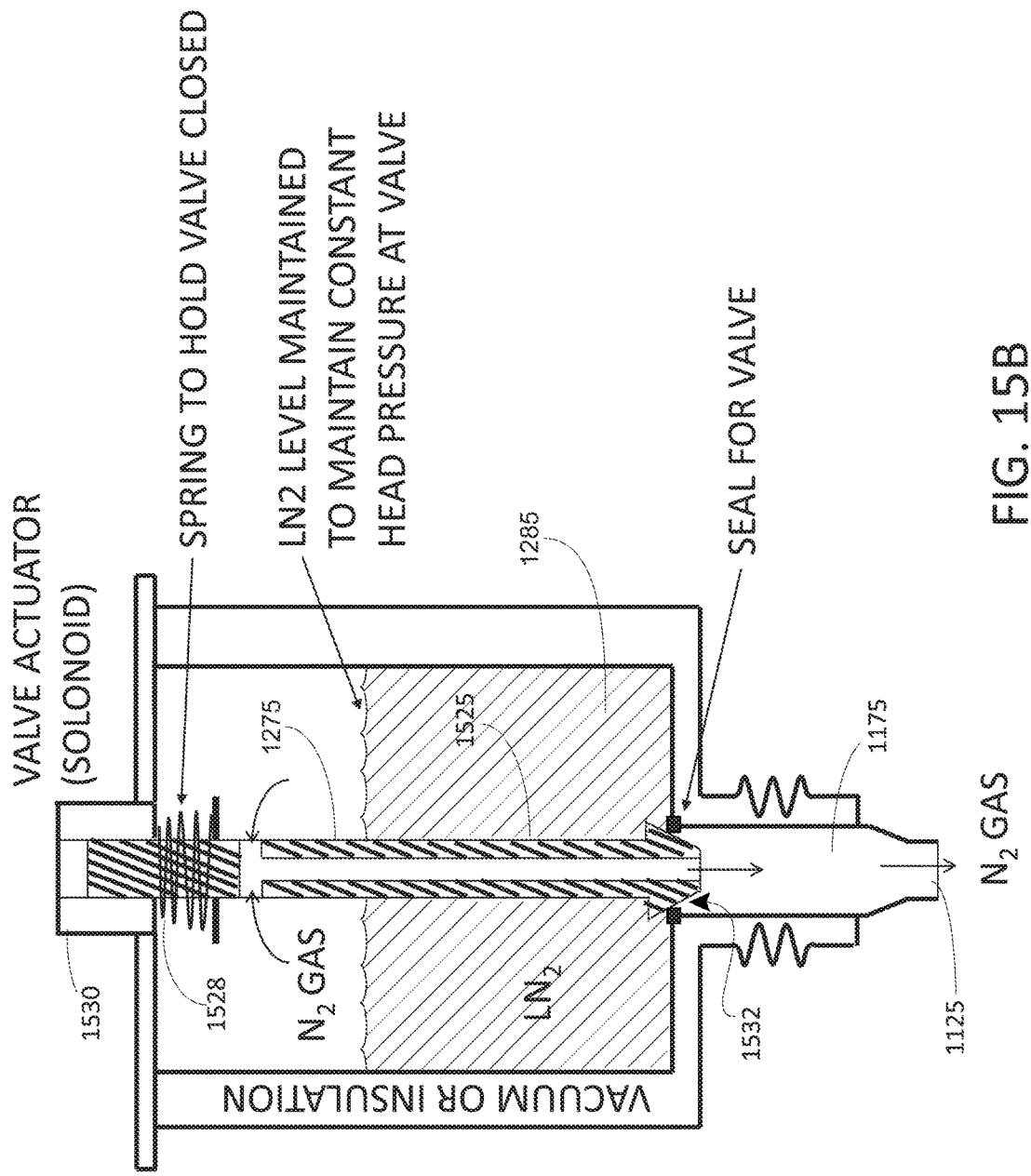

FIGS. 15A and 15B depict two stages of an embodiment of liquid nitrogen dosing system 1110. In the embodiments illustrated by FIGS. 15A and 15B, a cup 1510 may be configured to substantially surround a cross-section of funnel 1275 such that cup 1510 may slide along the length of funnel 1275. For instance, the cup 1510 may be formed with a hole in the center to accommodate for funnel 1275. In some embodiments, the cup 1510 is lowered to a bottom of the reservoir 1285 in order to gather cryogenic liquid. The cup 1510 may then be raised and the cryogenic liquid emptied into funnel 1275. The funnel 1275 optionally includes holes 1515 through which the cryogenic liquid can flow from cup 1510 into funnel 1275. The holes 1515 may be positioned above a maximum liquid level maintained in the reservoir 1285. In some embodiments, the funnel is a hollow cylinder or tube that is open on each end. As is discussed in greater detail with reference to FIG. 15B, holes 1515 in the funnel 1275 may also be configured to allow gas evaporated from the cryogenic liquid to enter the funnel 1275. A seal 1520 is optionally used to close an opening between the cup 1510 and funnel 1275. The seal 1520 may be configured to prevent any leakage of cryogenic liquid from the cup 1510.

In the embodiments illustrated by FIG. 15B, reservoir 1285 may be formed with a hole or aperture 1532 in the bottom thereof. The aperture 1532 in the bottom of the reservoir 1285 may lead directly to output pipe 1125. In some embodiments, a hollow valve shaft 1525 is used to control flow of cryogenic liquid into the output pipe 1125 by closing off or blocking the aperture 1532 in the bottom of the reservoir 1285. The hollow valve shaft 1525 is configured to allow gas evaporated from the cryogenic liquid to enter the funnel 1275 when the valve is closed through holes 1515 in the hollow valve shaft 1525. This keeps the interior of the system at or near atmospheric pressure and can also serve to purge and/or precool output pipe 1125. In some embodiments, a spring 1528 is configured to hold the hollow valve shaft 1525 down (closed to liquid but open to gas) in a default position. The hollow valve shaft 1525 rests in aperture 1532 at the bottom of liquid nitrogen dosing system 1110. The hollow valve shaft 1525 is optionally open at both ends such that gas can vent in both directions. In some embodiments, the hollow valve shaft is separated from the aperture 1532 by activation of a solenoid 1530 connected to the hollow valve shaft 1525, thereby allowing cryogenic liquid to flow past aperture 1532 into the output pipe 1125.

Figure 15C:
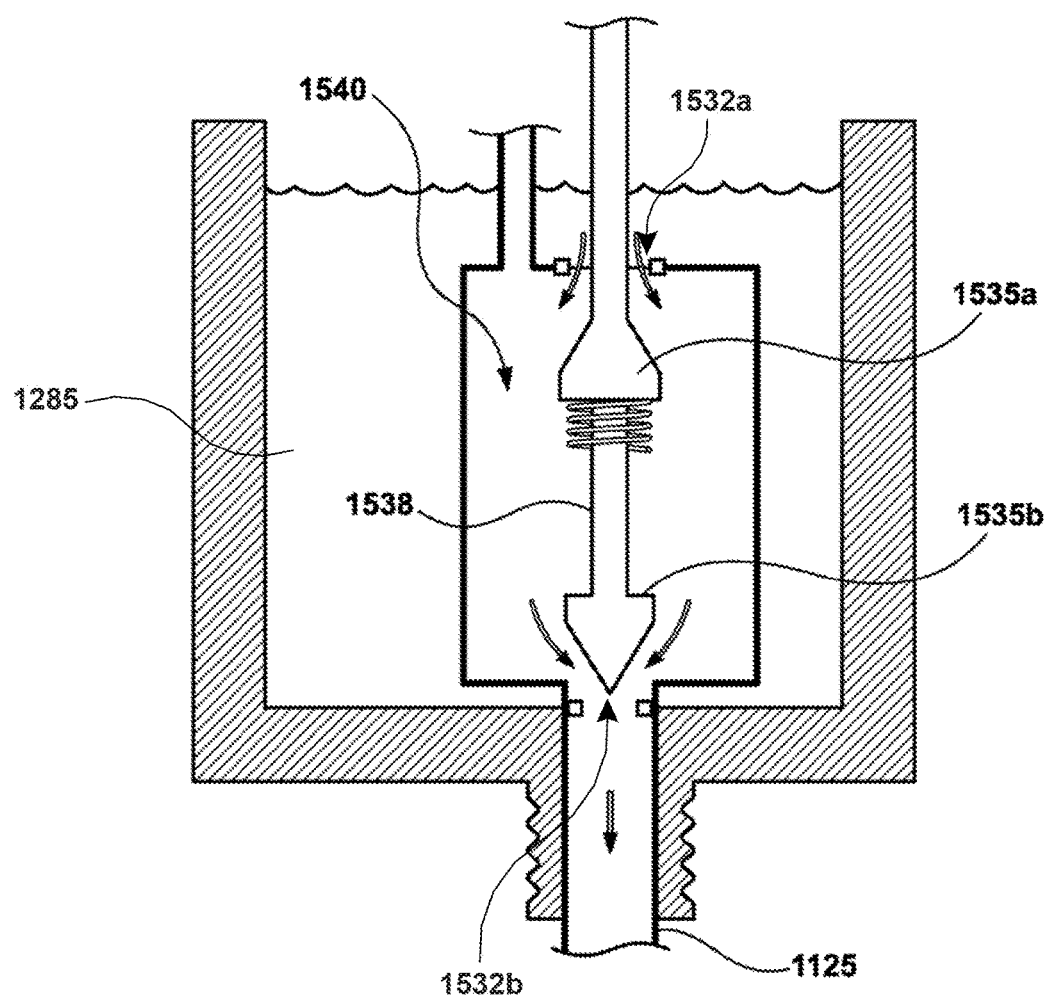

FIG. 15C illustrates an embodiment comprising a container 1540 disposed within reservoir 1285. The container 1540 may comprise two apertures 1532a and 1532b disposed respectively in the top and bottom of container 1540. In some embodiments, container 1540 is submerged in cryogenic liquid. For instance, container 1540 may be positioned in the reservoir 1285 such that aperture 1532a is below a minimum liquid level. In some embodiments, a shaft 1538 is disposed within the container 1540. The shaft 1538 may be operationally coupled to a lifting mechanism as is described in greater detail with reference to FIGS. 12-14. Two valves 1535a and 1535b may be formed on shaft 1538. Valve 1535a may be configured to form an airtight seal with aperture 1532a. Likewise, valve 1535b may be configured to form an airtight seal with aperture 1532b. In some embodiments, the shaft 1538 may be configured such that only one valve may engage one aperture at a time. For instance, when shaft 1538 is lowered, valve 1535a separates from and opening aperture 1532a, and valve 1535b engages with aperture 1532b, thereby sealing or closing aperture 1532b. This allows a controlled volume of cryogenic liquid to flow into container 1540. The container 1540 is vented to the atmosphere and thus near atmospheric pressure. When the shaft 1538 is raised valve 1535a is closes aperture 1532a and aperture e is opened. This allows the controlled volume of cryogenic liquid to flow into the output pipe 1125.

Figure 15D:
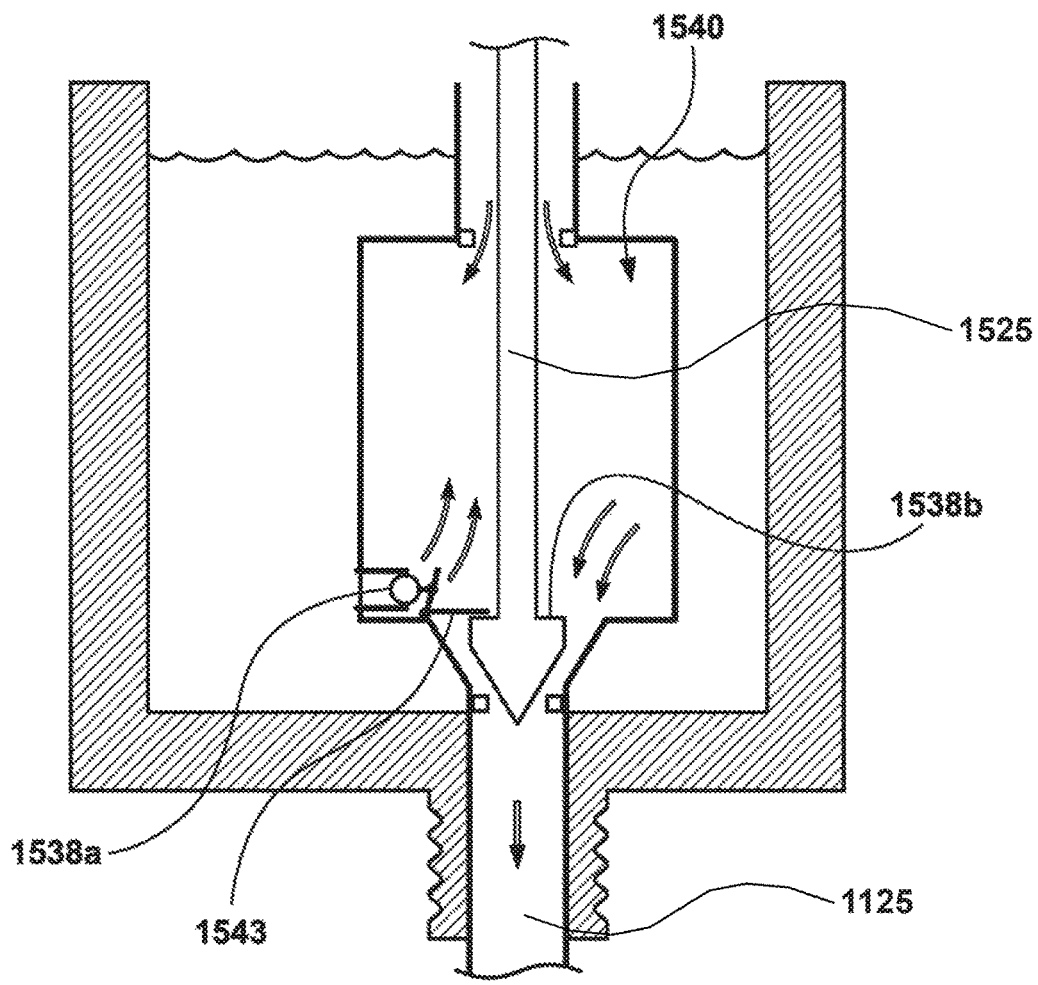

FIG. 15D illustrates an embodiment including two different valves 1538a and 1538b. When valve 1538b is closed, valve 1538a is opened allowing cryogenic liquid to fill container 1540. The opening and closing of valve 1538b is controlled by a trigger 1543 coupled to the shaft of valve 1538a. In some embodiments, valve 1538b is opened by raising shaft 1525, for example using lifting mechanism 1215 of FIG. 12. Opening valve 1538b allows the cryogenic liquid to flow out of container 1540 to output pipe 1125, and also closes valve 1538a.

Figure 15E:
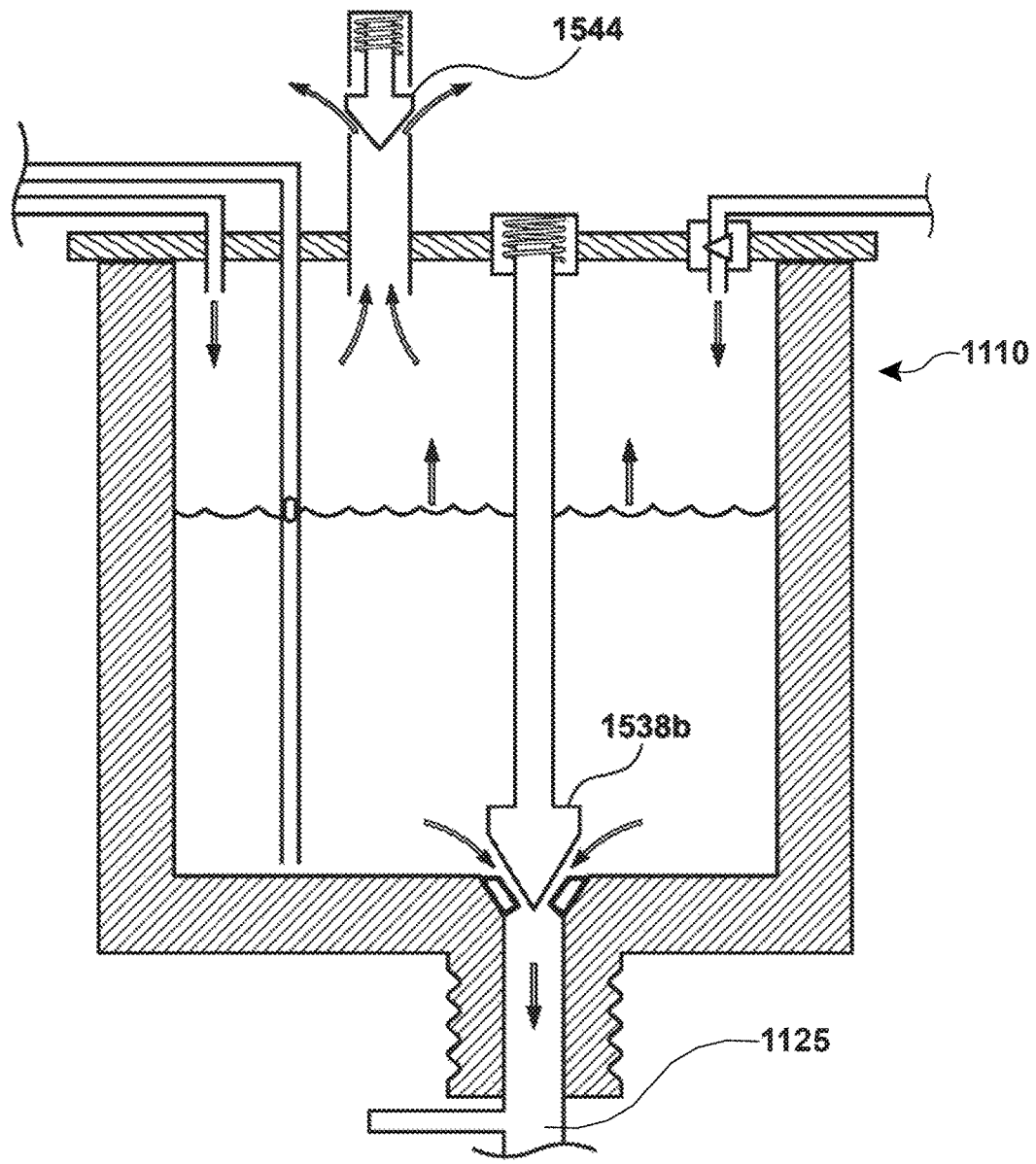

FIG. 15E illustrates embodiments in which the interior of liquid nitrogen dosing system 1110 is maintained at above atmospheric pressure, and this pressure facilitates flow of cryogenic cooling liquid through output pipe 1125 to container 3 (FIG. 11). These embodiments may include a pressure relief valve 1544 configured to maintain a steady pressure within the interior of liquid nitrogen dosing system 1110. Because this pressure is maintained in combination with controlled timing of the opening and closing of the valve 1538b, the flow of cryogenic cooling liquid to the output pipe 1125 when valve 1538b is opened is reproducible. In various embodiments, pressure relief valve 1544 is configured to maintain pressures of less than or equal to 5, 10 or 15 psi above atmospheric pressure. In some embodiments, pressure relief valve 1544 is adjustable. Gas released from pressure relief valve 1544 is optionally routed to output pipe 1125 for cooling and/or purging.

Figure 15F:
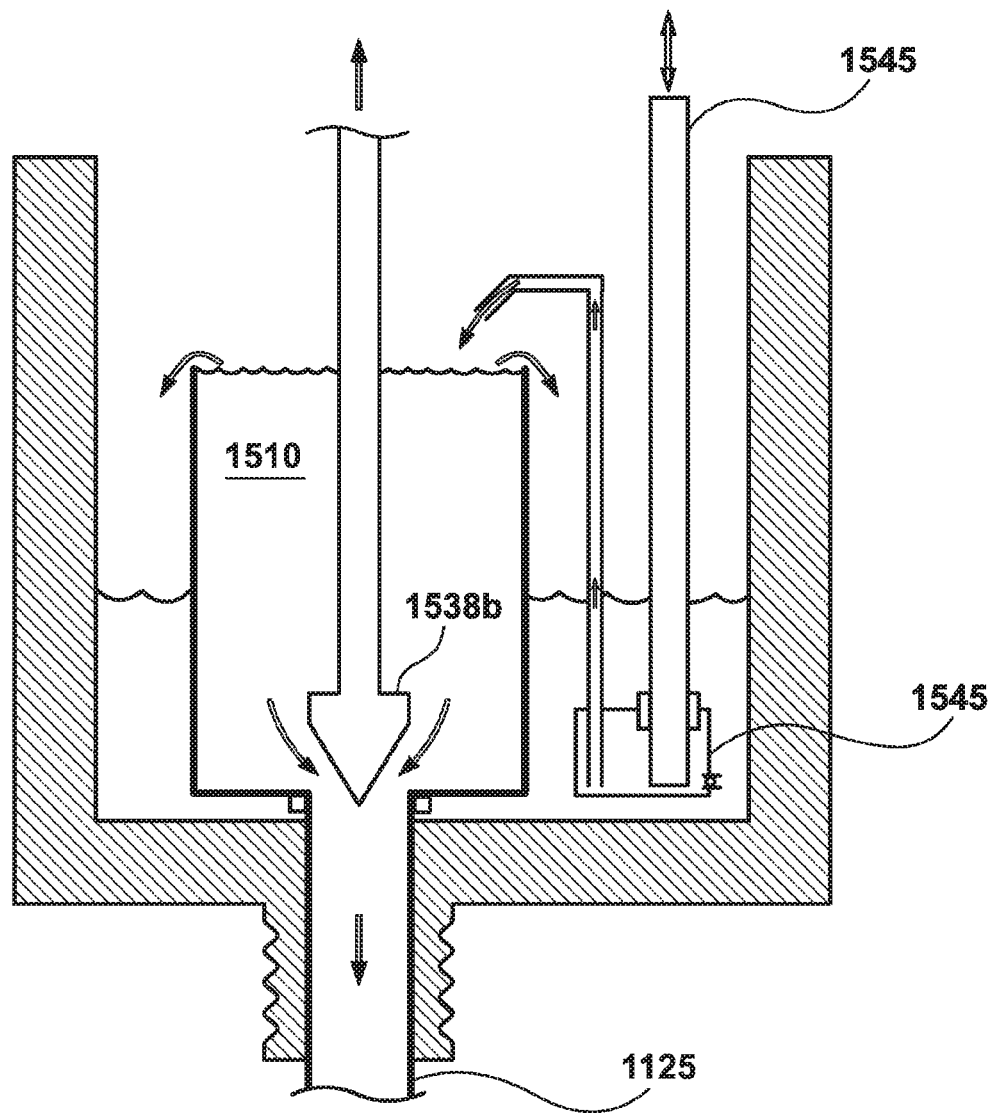

FIG. 15F illustrates embodiments in which cup 1510 is filled to overflowing. As a result when valve 1538b is opened a volume of cryogenic liquid equal to the volume of cup 1510 is transferred to output pipe 1125. All or part of this volume can be provided in a sequence of doses by opening and closing valve 1538b. Because the cup is at approximately atmospheric pressure and the flow is gravity fed, the volume of each dose is proportional to a length of time valve 1538b is open. Cup 1510 is filled using a pump 1545 such as a piston pump. The delivery of additional cryogenic liquid into cup 1510 may be avoided when the cup 1510 is being emptied.

Figure 15G:
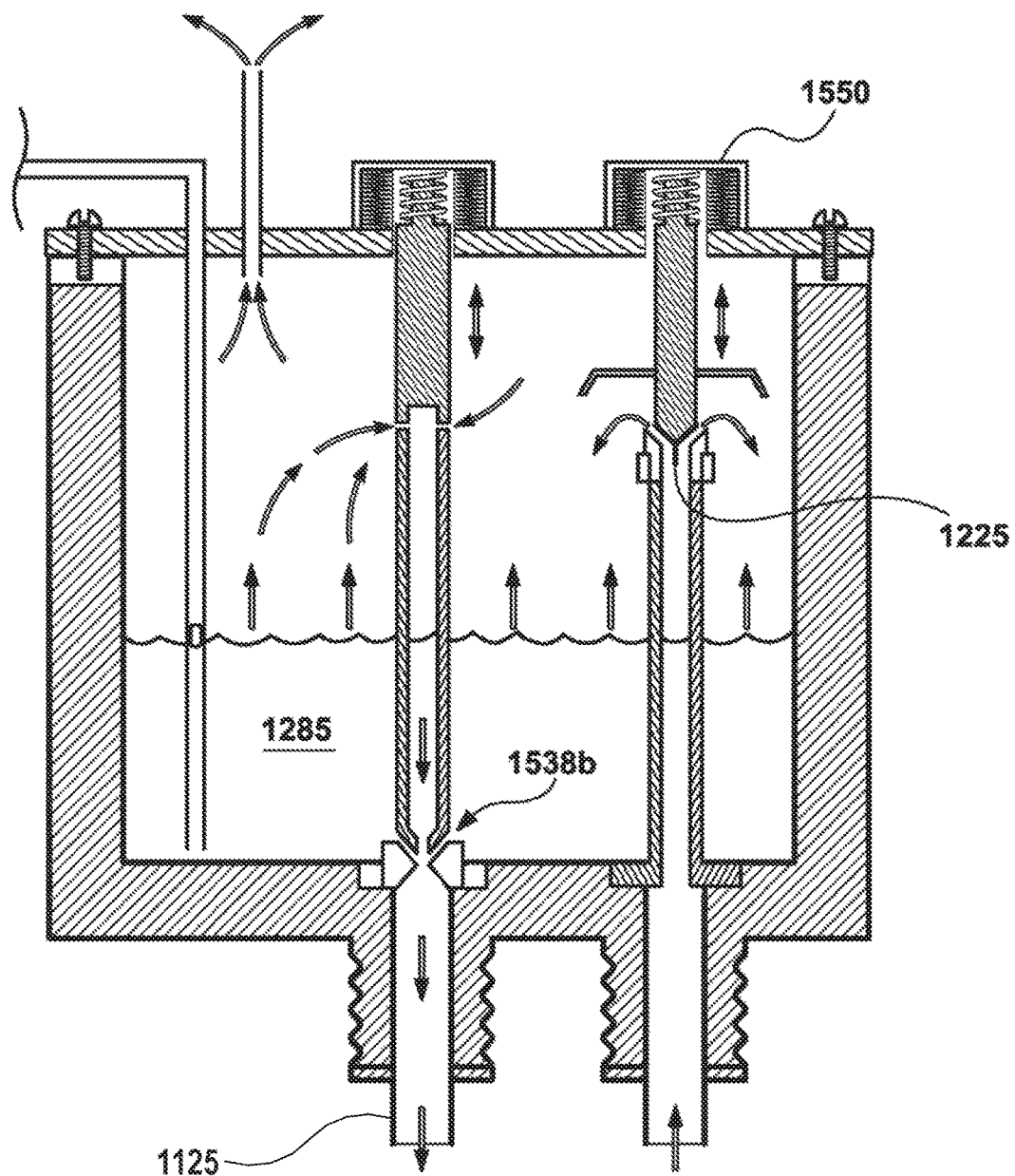

FIG. 15G illustrates embodiments including an actuating valve 1225 disposed within the interior of liquid nitrogen dosing system 1110, e.g. within reservoir 1285. Having actuating valve 1225 inside and exposed to the vapor of the liquid nitrogen reduces warming and boiling of the cryogenic liquid as the liquid passes though the valve. In some embodiments, actuating valve 1225 is opened and closed using a solenoid 1550. In some embodiments, valve 1538b configured to release cryogenic liquid to output pipe 1125, includes the structures illustrated in FIG. 15B. However, other embodiments of valve 1538b discussed herein may be used in combination with the actuating valve 1225 illustrated in FIG. 15G. Solenoid 1550, and the other solenoids illustrated herein, optionally includes a bellows to separate electronic components of solenoid 1550 from the cryogenic liquid and vapor thereof.

Figure 16:
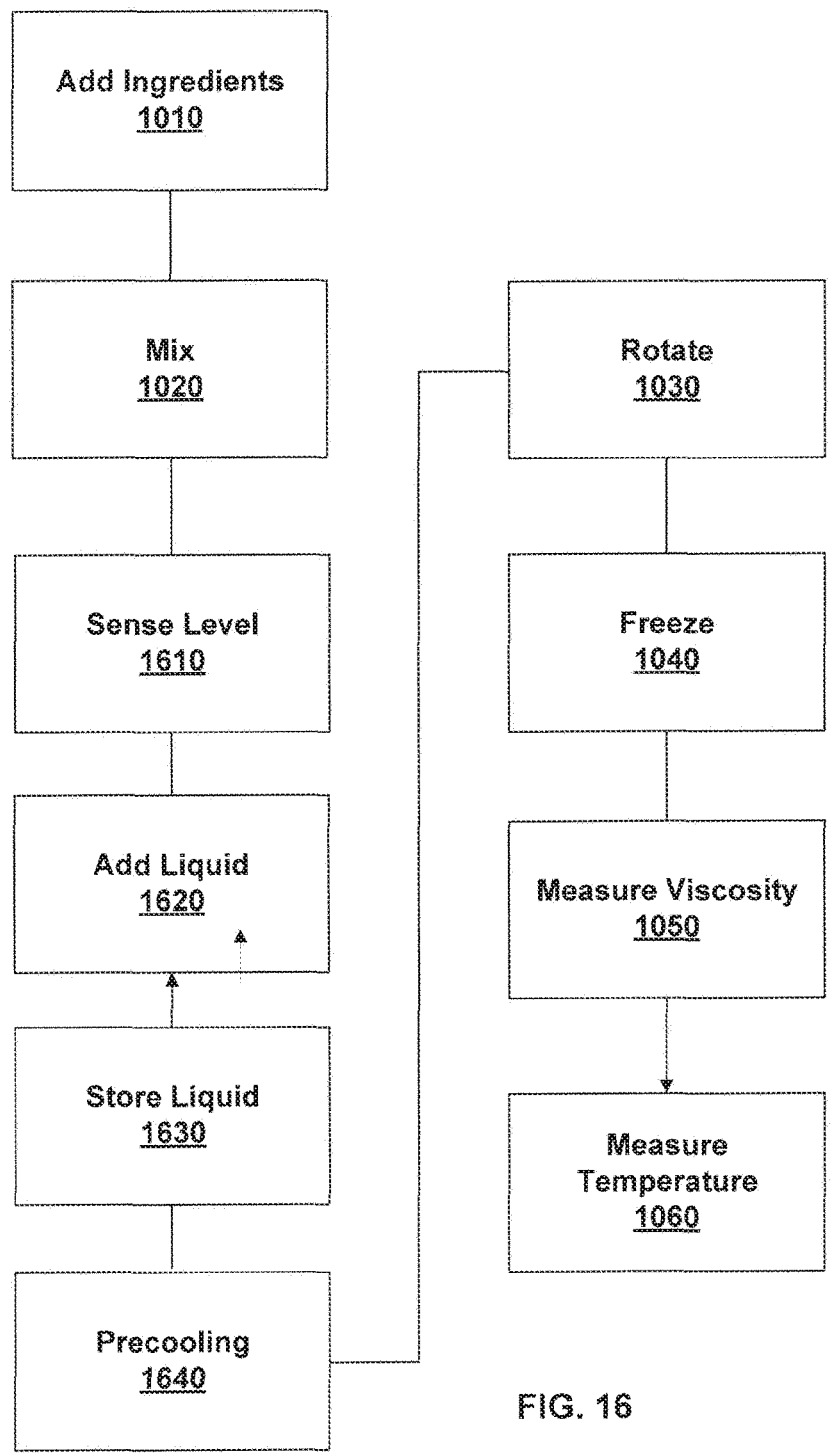
FIG. 16 illustrates methods of making ice cream, according to various embodiments of the invention.

FIG. 16 illustrates methods of making ice cream, according to various embodiments. These methods are optionally performed using the embodiments illustrated by FIG. 11, and are optionally performed as part of the methods illustrated in FIG. 10. At step 1010, ingredients are added to the container 3, as discussed in greater detail elsewhere herein. In Mix step 1020 the ingredients are mixed using one or more beaters 2 disposed within the container 3. Mix step 1020 is also discussed in greater detail elsewhere herein.

In a sense level step 1610, a level of liquid nitrogen or another cryogenic liquid within the liquid nitrogen dosing system 1110 is sensed using level sensor 1260.

In an add liquid step 1620, liquid nitrogen or other cryogenic liquid is added to the liquid nitrogen dosing system 1110 from a pressurized liquid supply. The addition is optionally controlled by actuating valve 1225 and responsive to the level sensor 1260.

In a store liquid step 1630, the liquid nitrogen or other cryogenic liquid is stored in the reservoir 1285 of liquid nitrogen dosing system 1110. This storage may be at approximately atmospheric pressure or at a controlled pressure. The pressure is optionally controlled by a relief valve 1544.

In an optional precooling step 1640, output pipe 1125 is precooled. This is optionally accomplished using a gas of the liquid nitrogen or other cryogenic liquid stored in the liquid nitrogen dosing system 1110. Precooling step 1640 may be a continuous process in which the gas flows through output pipe 1125 to both cool and purge.

Rotate Step 1030, is discussed elsewhere herein, and includes rotating container 3 and/or one or more of beaters 2.

Dispense step 1650 includes dispensing the added liquid nitrogen from the liquid nitrogen dosing system 1110 into the container 3 in a controlled amount. Dispense step 1650 can occur during Mix Step 1020, Rotate Step 1030, freeze step 1040, measure viscosity step 1050, and/or measure temperature step 1060, for example. Dispense step 1650 may result in cooling and/or freezing of the ingredients. Dispense step 1650 optionally occurs in one or more doses as controlled by control circuit 510. The liquid dispensed in dispense step 1650 has been separated from the vapor of this liquid. This greatly improves the mass and volumetric precision of each dose. As discussed elsewhere herein, the amount of cryogenic liquid dispensed in dispense step 1650 is optionally responsive to viscosity measurement, recipe, temperature, etc.

Measure Viscosity Step 1050 and Measure Temperature Step 1060 are discussed elsewhere herein.

Certain Examples Liquid Dosing Systems

Figure 17A:
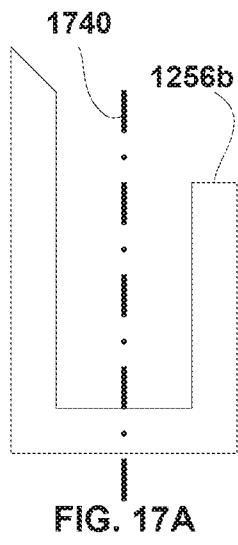
FIGS. 17A-17I illustrate various scoops that may be included in a doser, according to various embodiments of the invention.
Figure 17B:
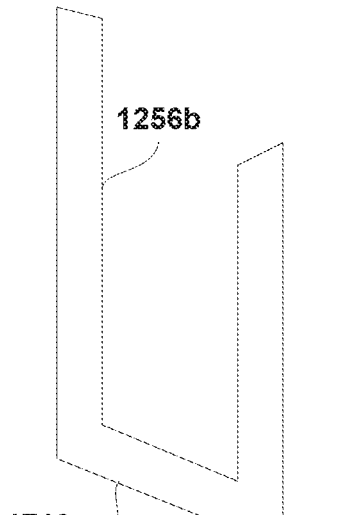
Figure 17C:
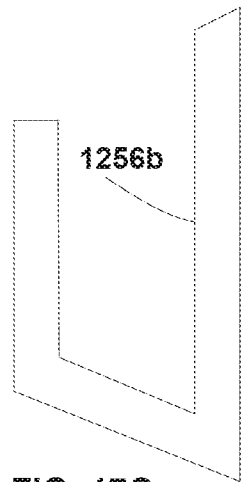
Figure 17D:
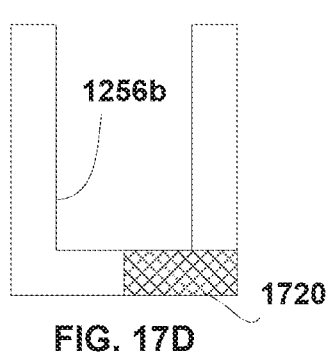
Figure 17E:
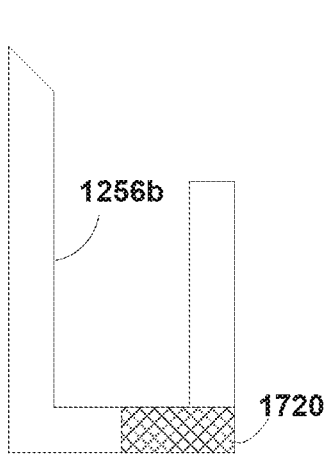
Figure 17F:
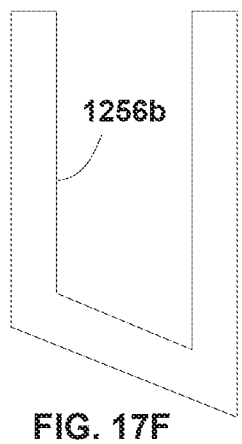
Figure 17H:
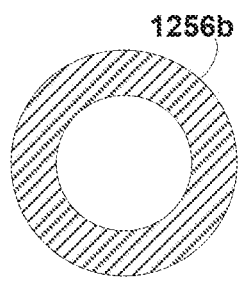
Figure 17I:
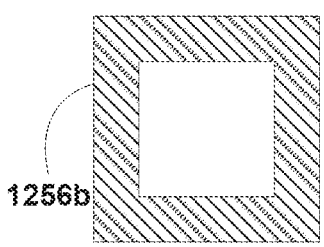
Figure 17G:
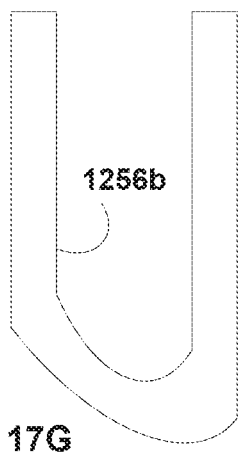
Figure 21:
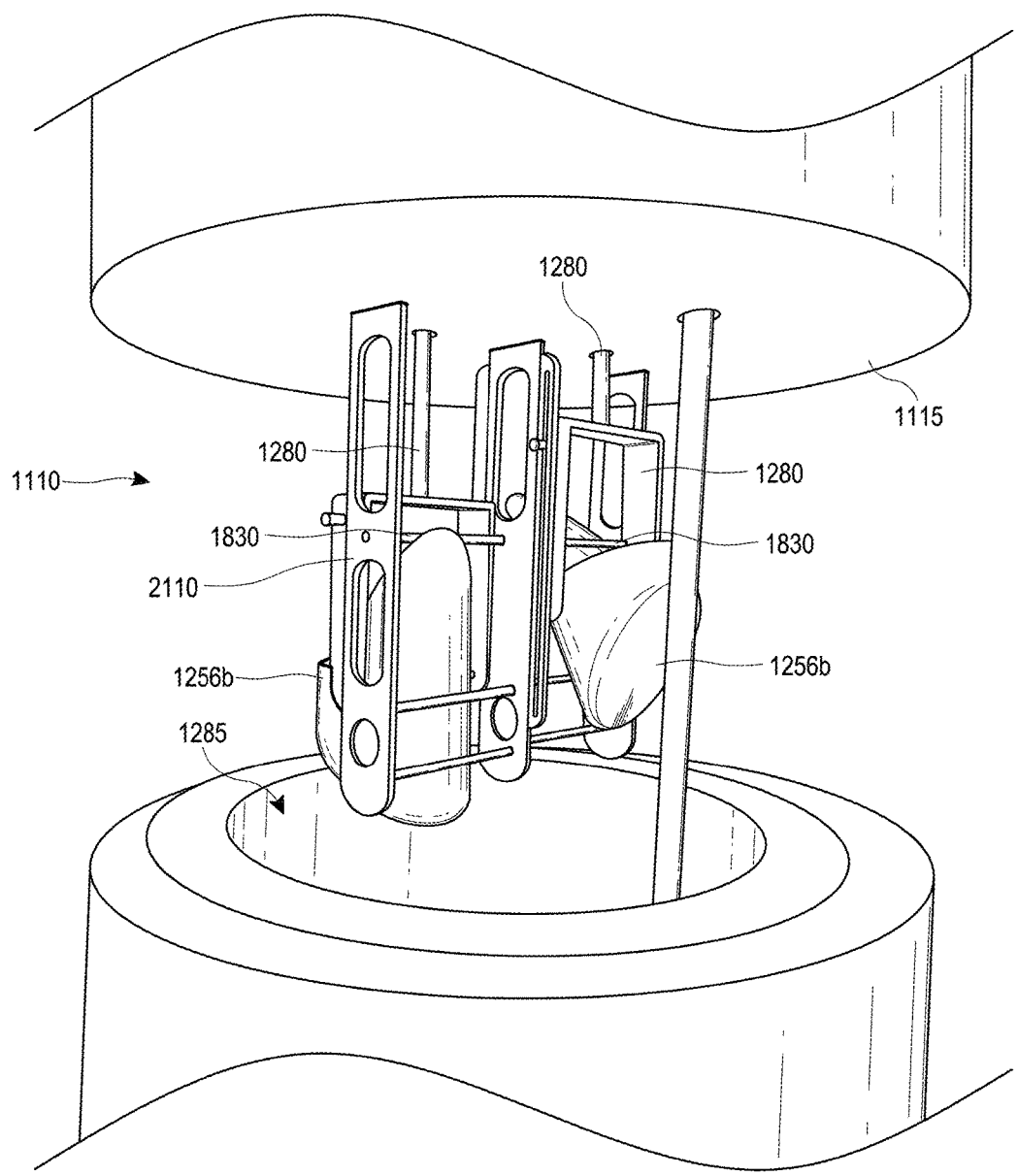
FIG. 21 illustrates the kettle of FIGS. 20A-20B in the open state, showing the dipping cups and dipping mechanisms, and level sensor.

FIGS. 17A-17I illustrate various embodiments of scoop 1256b that may be included in a doser 1110, according to various embodiments of the invention. FIGS. 17A-17G illustrate cross-sectional side views and FIGS. 17H and 17I illustrate top views. In various embodiments, scoop 1256b can have capacity to hold, for example, 25 ml to 2,500 ml of cryogenic liquid. In preferred embodiments, scoop 1256b can have capacity to hold 120 ml to 130 ml, for example 121 ml, of cryogenic liquid. In some embodiments, scoop 1256b is asymmetric. The asymmetric shape of a scoop can affect the way the scoop mechanically interacts with the liquid nitrogen due to differences in buoyancy of the portions of the scoop caused by the asymmetric structure. The asymmetric shape of a scoop can also affect the way the scoop mechanically interacts with structure that tilts the scoop to dispense liquid nitrogen carried in the scoop, as illustrated in FIG. 21. For example, when the scoop 1256b is lowered into the cryogenic liquid, one side of the scoop 1256b has a different buoyancy than the other side of the scoop 1256b. In some embodiments, the asymmetry of the scoop 1256b can refer to a height differential between portions of a lower surface of the scoop 1256b. In some embodiments, the difference in buoyancy causes scoop 1256b to rotate when it comes in contact with the cryogenic liquid. For example, scoop 1256b may be rotated from a vertical orientation to a horizontal orientation when lowered into cryogenic liquid. An scoop 1256b configured to have an asymmetric structure may can have a difference in shape between one part of scoop 1256b and another part of scoop 1256b. For example, FIG. 17B illustrates an embodiment of scoop 1256b in which the bottom 1710 is sloped. When lowered into cryogenic liquid, an edge 1715 of scoop 1256b contacts the cryogenic liquid, this tends to lift the right side of scoop 1256b and rotate scoop 1256b in a counter-clockwise direction, as viewed from FIG. 17B. FIG. 17D illustrates an example in which asymmetry in buoyancy is achieved by using a material 1720 (illustrated with cross-hatching) having a lesser or greater density than other parts of Scoop 1256b.

As illustrated, scoop 1256b can include a wide variety of shapes and structures. One of ordinary skill in the art will understand that there are many additional shapes and structures that could be used to achieve asymmetric buoyancy. For example, in addition to the circular and square shapes illustrated in FIGS. 17H and 17I, scoop 1256b could be oval, triangular, rectangular, hexagonal, etc. Scoop 1256b may be characterized by a center (long) axis 1740 illustrated by a dashed line in FIG. 17A.

Figure 18:
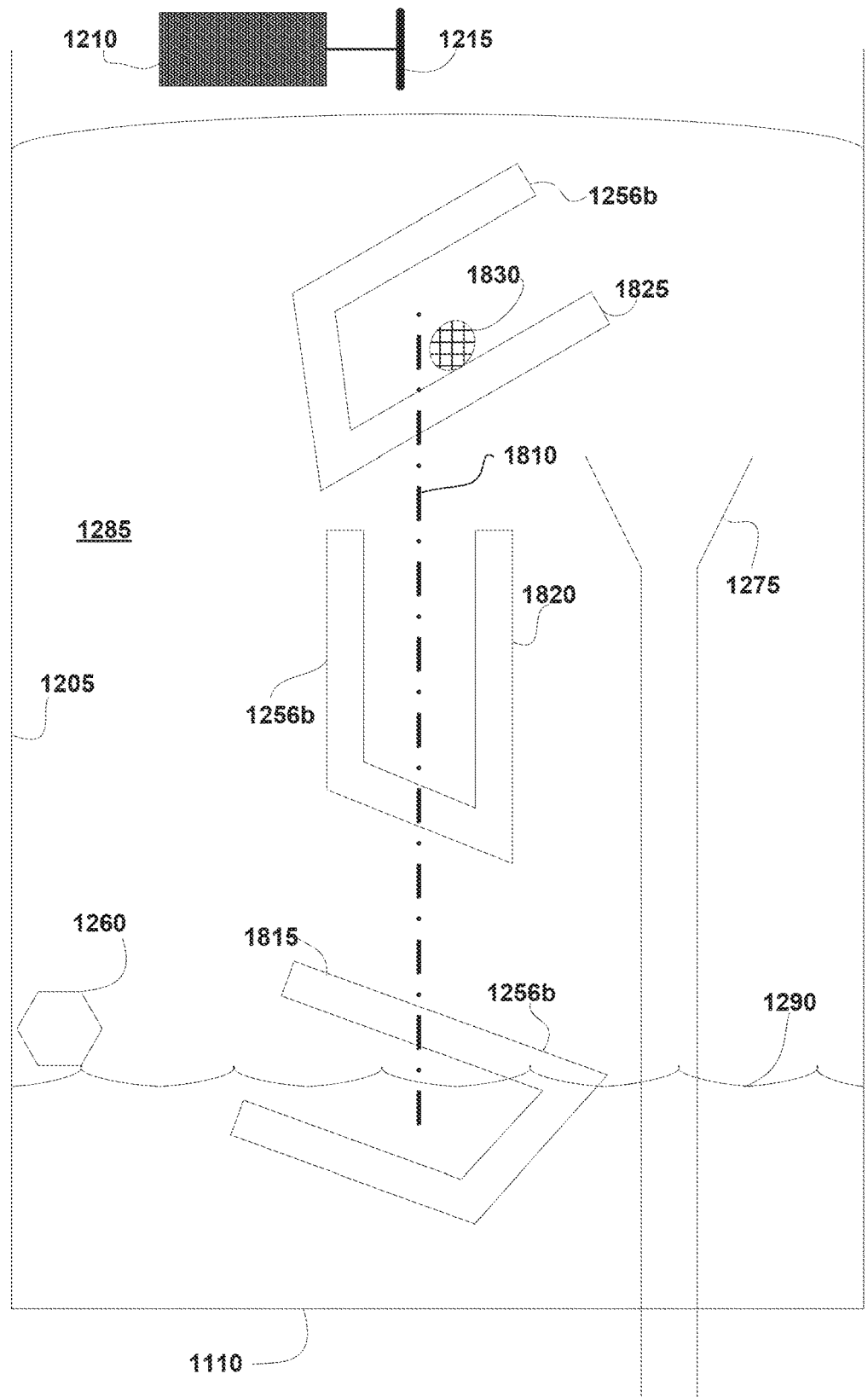
FIG. 18 illustrates a doser, according to various embodiments of the invention.
Figure 23:
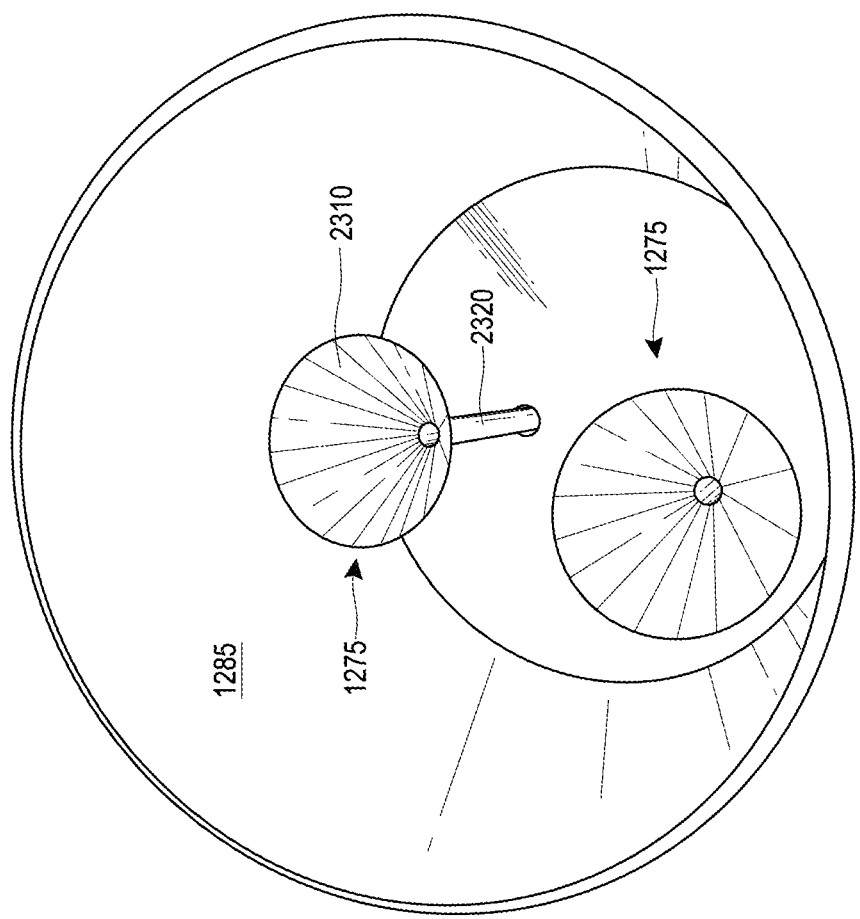
FIG. 23 illustrates another view of the kettle of FIG. 20 in the open state, showing the dipping mechanisms, funnels, and inlet orifice.

FIG. 18 illustrates a doser 1110, according to various embodiments of the invention. This doser 1110 includes one or more scoops 1256b, which is optionally a scoop 1256b having asymmetric buoyancy such as those illustrated in FIGS. 17A-17I. The illustrated embodiments of doser 1110 further include funnel 1275. As discussed elsewhere herein, funnel 1275 is an output configured to receive cryogenic liquid from the scoop 1256b and to transfer the received cryogenic liquid from the reservoir 1285 formed by walls 1205. In some embodiments, the funnel 1275 is open to the atmosphere, and the reservoir 1285 of doser 1110 is at essentially atmospheric pressure. The cryogenic liquid can be conveyed to container 3 (for example, as illustrated in FIGS. 1, 20 and 23) and may using gravity in some embodiments, or via a pump or other system in other embodiments.

Doser 1110 further includes an embodiment of level sensor 1260 configured for detecting liquid level 1290, e.g., the level of cryogenic liquid within the reservoir 1285. An actuator 1210 (e.g., motor) and lifting mechanism 1215 are configured to raise and lower scoop 1256b. Lifting mechanism 1215 may be mechanically connected to scoop 1256b via a rod, chain, belt, and/or wire, etc. In some embodiments, the lifting mechanism 1215 and the scoop 1256b are configured to pivot relative to one another. Other elements, such as those illustrated elsewhere herein, are optionally included in the embodiments of doser 1110 illustrated in FIG. 18. For example, level sensor 1260 may be configured to control actuating valve 1225 (illustrated in FIG. 12) so as to maintain liquid level 1290.

In FIG. 18 scoop 1256b is illustrated in three different positions within reservoir 1285. These are referred to as a lower position 1815, an intermediate position 1820 and an upper position 1825. In the lower position 1815, the asymmetric design of the scoop 1256b may cause the scoop to tilt from a vertical orientation to a substantially horizontal orientation as the scoop is lowered into the cryogenic liquid. The scoop 1256b may be configured to scoop up a portion of the cryogenic liquid. In the upper position, scoop 1256b is configured to dispense the cryogenic liquid into funnel 1275. Scoop 1256b may move along a transit path 1810, (illustrated by a dashed line). Transit path 1810 may be linear and/or curved. In some embodiments, the angle of a line tangent to path 1810 at any point is within 1 degree of vertical. In various embodiments, the angle of a line tangent to path 1810 at any point is within 30, 60 or 90 degrees from vertical. In various embodiments, path 1810 forms a closed loop allowing for orbital movement of scoop 1256b. In some embodiments, one or more scoops 1256b may be moved by a mechanical rotational system that moves the scoop 1256b in an orbital motion within the doser 1110. For example, the mechanical rotational system may move the scoop into the lower position 1815 where the scoop 1256b receives liquid. The scoop 1256b may then be moved to a position to transfer the liquid from the scoop 1256b into the funnel 1275.

In some embodiments, scoop 1256b may be configured to be in a vertical orientation while at the intermediate position. In some embodiments, the scoop is configured to rotate to a horizontal orientation in the upper position 1825. These rotations are measured relative to the center axis 1740 (described in FIG. 17A) of scoop 1256b and are around an axis that moves approximately along, parallel to, or offset from transit path 1810 and is roughly orthogonal to the center axis 1740 and the plane of FIG. 18. Scoop 1256b is optionally further configured to rotate into an approximately horizontal orientation in the lower position 1815. The rotations at the upper position 1825 and lower position 1815 may be in the same or different directions (e.g., counter-clockwise in the lower position 1815 and clockwise in the upper position 1825). At the lower position, one or more sections of the lip of scoop 1256b may be situated below liquid level 1290 so as to allow cryogenic liquid to flow into the scoop 1256b.

The rotations shown in FIG. 18 may be caused by one or more cams 1830, by a difference in buoyancy between different parts of scoop 1256b, and/or by other forces from the liquid. For example, as scoop 1256b is lowered from intermediate position 1820 to lower position 1815 either a cam (similar to cam 1830) or asymmetric buoyancy may cause the scoop 1256b to rotate from a vertical orientation to a substantially horizontal orientation. As the scoop 1256b is raised from the lower position 1815 to the intermediate position, the scoop 1256b is caused to rotate from a substantially horizontal orientation to a vertical orientation. In some embodiments, cam 1830 may cause the scoop 1256b to rotate from a substantially horizontal orientation to a vertical orientation as the scoop 1256b is raised from the lower position 1815 to the intermediate position. In some embodiments, this rotation is caused by the weight of the liquid and/or a predisposition of the scoop to be in a vertical orientation. In some embodiments, the rotation of the scoop 1256b between intermediate position 1820 and upper position 1825 may be caused by cam 1830. Cam 1830 may be a mechanical device configured to contact scoop 1256b and apply a rotational force thereto. One of ordinary skill in the art will understand that a cam can be structured in a variety of shapes and sizes to perform this function. For instance, in some embodiments, scoop 1256b is raised to the upper position 1825 at which point a movable cam 1830 causes the scoop 1256b to rotate to a substantially horizontal orientation. In some embodiments, the cam 1830 is stationary and is configured to contact the scoop 1256b as the scoop 1256b is raised to the upper position 1825. The higher the scoop 1256b is raised, the more horizontal the scoop 1256b becomes. Cam 1830 may include a rod, tab, gear, etc. A cam may be a rotating or sliding piece in a mechanical linkage used especially in transforming rotary motion into linear motion or vice versa. As used herein, a cam may also refer to a fixed member used to transform linear motion into rotary motion.

Scoop 1256b may not require asymmetric buoyancy in embodiments in which a cam, tab, guide, or other mechanical device is used to rotate scoop 1256b as it is lowered past or raised from the cryogenic liquid level 1290. In these embodiments, the rotation from a vertical orientation to a horizontal orientation is achieved by contact between the mechanical device and scoop 1256b or a part attached to scoop 1256b. For example, as scoop 1256b moves from the upper position to the lower position, contact with a mechanical device may rotate scoop 1256b partially around an axis.

As used herein the terms vertical orientation and horizontal orientation are meant to be relative. The "vertical orientation" being closer to vertical relative to the "horizontal orientation." In FIG. 18 the scoop 1256b is illustrated in a vertical orientation at intermediate position 1820 and in horizontal orientations in positions 1815 and 1825. Note that these orientations need not be absolutely horizontal or vertical. The designations of vertical and horizontal orientations are relative and approximate. In various embodiments, the horizontal orientations in positions 1815 and 1825 can be at least 30, 45, 60, or 90 degrees from vertical, or between 30 to 135 degrees. In a preferred embodiment, the horizontal orientations in positions 1815 and 1825 can be 90 to 95 degrees. In some embodiment, the scoop 1256b is rotated no more than 90 degrees in the lower position 1815 and no less than 90 degrees in the upper position 1825. The horizontal orientation at position 1815 is sufficient to bring a lip of scoop 1256b below the preferred level 1290 of cryogenic liquid such that cryogenic liquid is received by scoop 1256b in the lower position. In some embodiments, the scoop 1256b may be configured to remain in a vertical orientation in the lower orientation 1815 and only rotate to a substantially horizontal orientation in the upper orientation 1825.

Actuator 1210, e.g., a motor or pneumatic, is configured to move the scoop 1256b between the upper and lower positions. Actuator 1210 is optionally configured to operate lifting mechanism 1215 to move a chain, cable, rod, and/or the like connecting lifting mechanism 1215 and scoop 1256b. In various embodiments, actuator 1210 can be configured to move scoop 1256b between the upper position 1825 and the lower position 1815 at rates of at least 1, 5, 10 or 15 times per minute or any rate there between, or between 1-20 times per minute. In a preferred embodiment, the scoop 1256b can be moved between the upper position 1825 and the lower position 1815 between 6-10 times per minute. In various embodiments, scoop 1256b may only need to move between the upper position 1825 and lower position 1815 once every 5, 10, 30, 60, 100, or 300 seconds. As discussed elsewhere herein, actuator 1210 is optionally controlled by control circuit 510 and/or control panel 7 in response to viscosity measurements and/or a recipe. In some embodiments, actuator 1210 may be implemented and controlled in such a way as to deliver doses of cryogenic liquid in controlled volumes. In some embodiments, this may occur by means of controlling the angular position of scoop 1256b. The volume of each dose may range from a maximum of the inner volume of scoop 1256b, to a minimum dictated by the smallest controllable increment of the actuating mechanism. For example this volume may be $\frac{1}{100}^{th}$ of the volume of scoop 1256b. Each dose may be individually sized to meet the needs of the application. Several examples include embodiments where the timing and volume of each dose may be pre-programmed, determined in real time by control software, or manually controlled by an operator by means of a user interface.

In some embodiments, reservoir 1285 includes two or more of scoop 1256b and/or funnel 1275. The two or more scoops 1256b may move along parallel, symmetric, or unique transit paths 1810 and have similar orientations at the positions discussed herein. The one or more scoops 1256b may be configured to dispense cryogenic liquid into the same and/or different funnels 1275. The different funnels 1275 may be configured to provide cryogenic liquid to the same and/or different containers 3. In some embodiments, reservoir 1285 provides cryogenic liquid to one, two, or more containers 3. The one or more containers 3 may be part of the same or separate devices. Actuator 1210 may be configured to move the two or more scoops 1256b. Some embodiments may include one or more actuators 1210, each of which may be configured to move one or more scoops 1256b.

Figure 19:
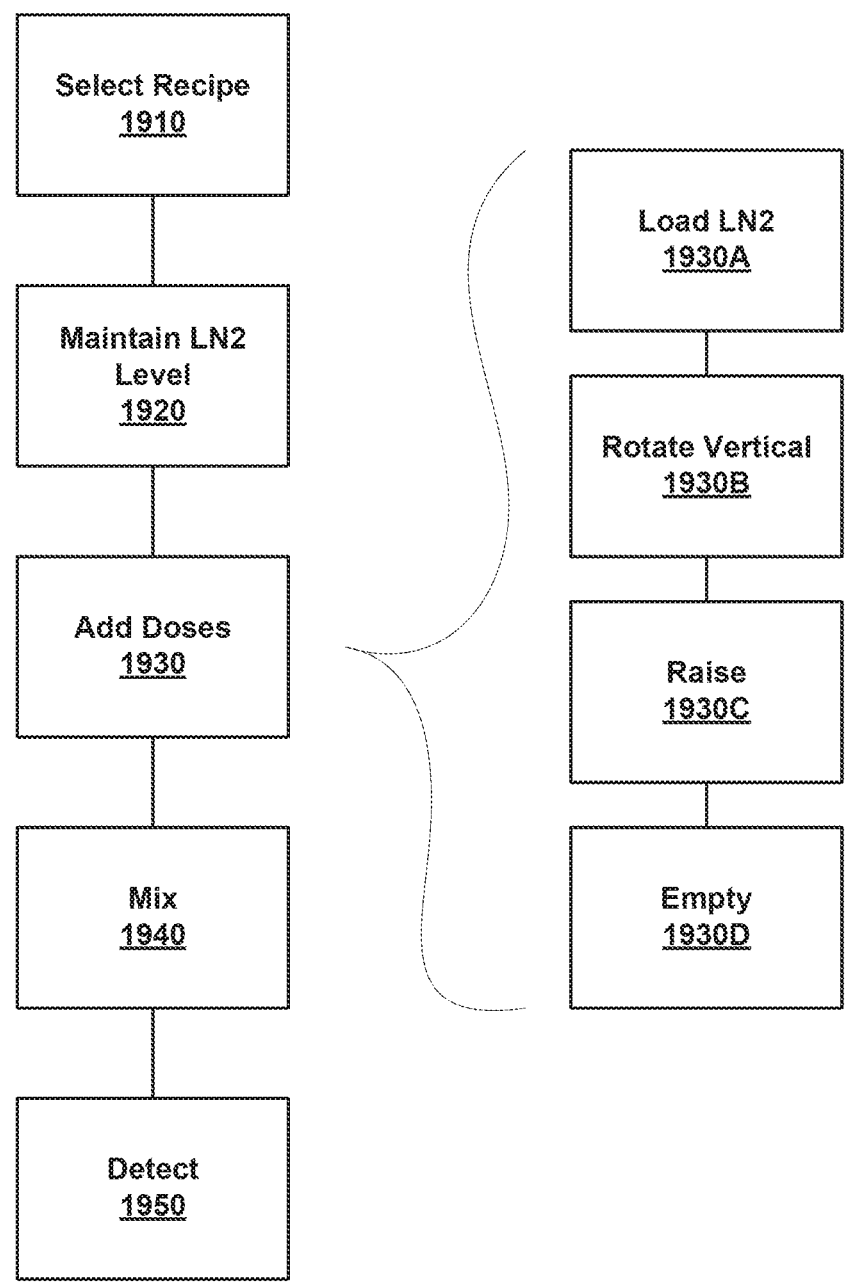
FIG. 19 illustrates a method of making a frozen confectionary, according to various embodiments of the invention.

FIG. 19 illustrates a method of making a frozen confectionary, according to various embodiments of the invention. This method includes a Select Recipe Step 1910 in which a recipe for a frozen confectionary is selected. Step 1910 optionally includes select ingredients Step 1010 (FIG. 10). Select Recipe Step 1910 is optionally performed using control circuit 510 and/or control panel 7 (FIGS. 5 and 1). Select Recipe Step 1910 optionally includes selecting an amount (e.g. volume and dosing pattern) of cryogenic liquid to add and a viscosity at which the frozen confectionary is done.

In a maintain $LN_2$ level step 1920, level sensor 1260 may be used to maintain level 1290 of cryogenic liquid in reservoir 1285 (FIG. 12). The cryogenic liquid is optionally delivered using actuating valve 1225, under the control of such as control circuit 510 and/or control panel 7.

In an add doses step 1930, doses of cryogenic liquid are added to container 3 from reservoir 1285. Step 1930 may include sub-steps load $LN_2$ step 1930A, rotate vertical step 1930B, raise step 1930C and empty 1930D. In add doses Step 1930 doses of cryogenic liquid are added to container 3 from reservoir 1285. In some applications, ingredients for the frozen confectionary are added prior to adding the cryogenic liquid. In load $LN_2$ Step 1930A, scoop 1256b is lowered into lower position 1815 and rotated to a horizontal orientation such that a lip of scoop 1256b goes below level 1290 and scoop 1256b receives cryogenic liquid. In rotate vertical step 1930B scoop 1256 is rotated to a vertical orientation and raised to intermediate position 1820. In raise step 1930C, scoop 1256b is raised to upper position 1825 while in a vertical orientation. In Empty step 1930D, cryogenic liquid is emptied from scoop 1256b into funnel 1275. This results in delivery of the cryogenic liquid into container 3. The scoop 1256b may be emptied by rotation from a vertical orientation to a horizontal orientation, although alternative methods are possible. The cryogenic liquid delivery may be at rates of at least 1, 5, 10, or 30 milliliters per second, or between 1 ml and 100 ml per second. In a preferred embodiment the cryogenic liquid delivery rate can be between 5 ml and 7 ml per second. The time between each dose signal may be as long as 60, 30, or 15 seconds, and may be as short as 0.1, 0.5, or 1 seconds, or between 0.1 seconds to 60 seconds. In a preferred embodiment the time between each dose signal can be between 1 second and 5 seconds. In step empty 1930D, the angular position of scoop 1256b may be precisely controlled to allow for delivery of cryogenic liquid in discrete doses of variable volumes, or in a continuous flow. The volume of each dose may be as large as the entire inner volume of scoop 1256b, or it may be as small as the smallest increment the control mechanism can perform. For example, one dose may be $\frac{1}{10}^{th}$, $\frac{1}{100}^{th}$, or $\frac{1}{1000}^{th}$ of the volume of scoop 1256b, or may be between the entire volume of the scoop (for example if the scoop is tiny and/or a large dose is desired) or $\frac{1}{1000}^{th}$ of the volume of scoop (for example if the scoop is large and/or a small dose is desired). In a preferred embodiment, one dose can be between $\frac{1}{6}^{th}$ to $\frac{1}{8}$th of the volume of the scoop. By means of angular position control, each sequential dose may be individually sized and tailored to the requirements of the application. In addition, the rates of rotation of scoop 1256b may be controlled over time in such a way as to provide a continuous delivery of cryogenic liquid.

In a mix step 1940, the cryogenic liquid and ingredients are mixed. Mix step 1940 optionally includes rotate step 1030 and freeze step 1040. In a detect step 1950, the viscosity of the ingredients is detected. Detect step 1950 is optionally an embodiment of measure viscosity step 1050, which is discussed elsewhere herein.

Although described in the context of cryogenic liquid, for example liquid nitrogen, the liquid dosing system of FIGS. 17-19 can be used for retrieving portions of any liquid provided within the reservoir and providing the retrieved portions to a funnel or other transportation mechanism for transport to a mixing bowl or other desired location.

Overview of Certain Example Systems Implementing a Liquid Dosing System

FIGS. 20-23 illustrate an example system having a kettle housing a liquid dosing system as described with respect to FIGS. 17-19 above. In some embodiments, the system can include one, two, or more mixing bowls having any of the beaters as described above with respect to FIGS. 1-16. The mixing bowl(s) can be positioned to receive liquid from the kettle, whereby the liquid is retrieved from a reservoir within the kettle and directed toward the mixing bowl(s) via a liquid dosing system as described herein. In some embodiments the liquid can be liquid nitrogen, and the system can be used to produce a frozen confection, for example ice cream. However, it will be appreciated that such a liquid dosing system can be used to retrieve and direct liquid for a wide variety of applications, and liquid nitrogen is provided as one non-limiting example.

Figure 20A:
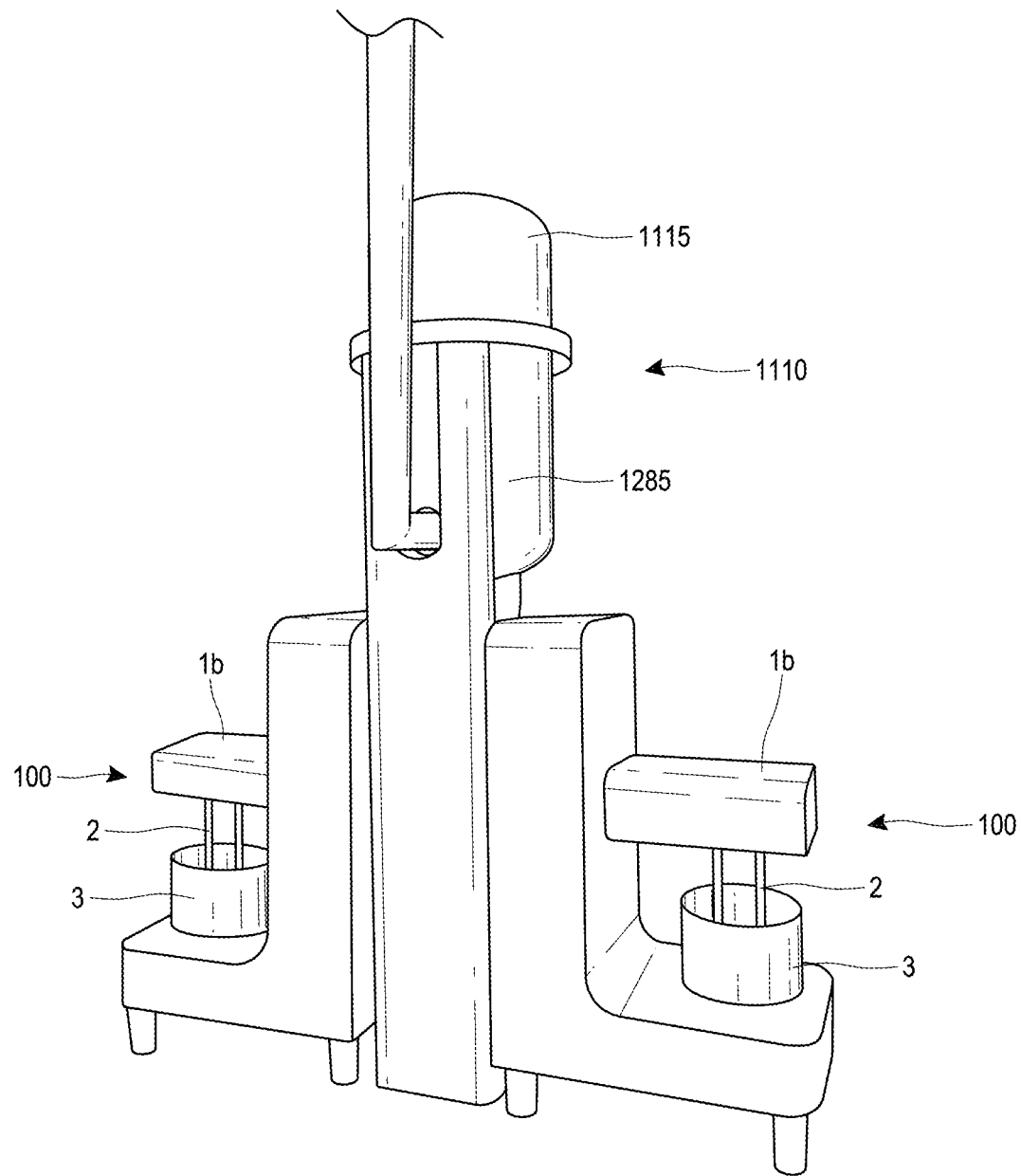
FIGS. 20A-20B illustrate views of an example of a kettle including a scoop doser situated between two example mixing machines, the kettle/scoop doser system configured to provide liquid (e.g., nitrogen) to each of the two mixing machines.
Figure 20B:
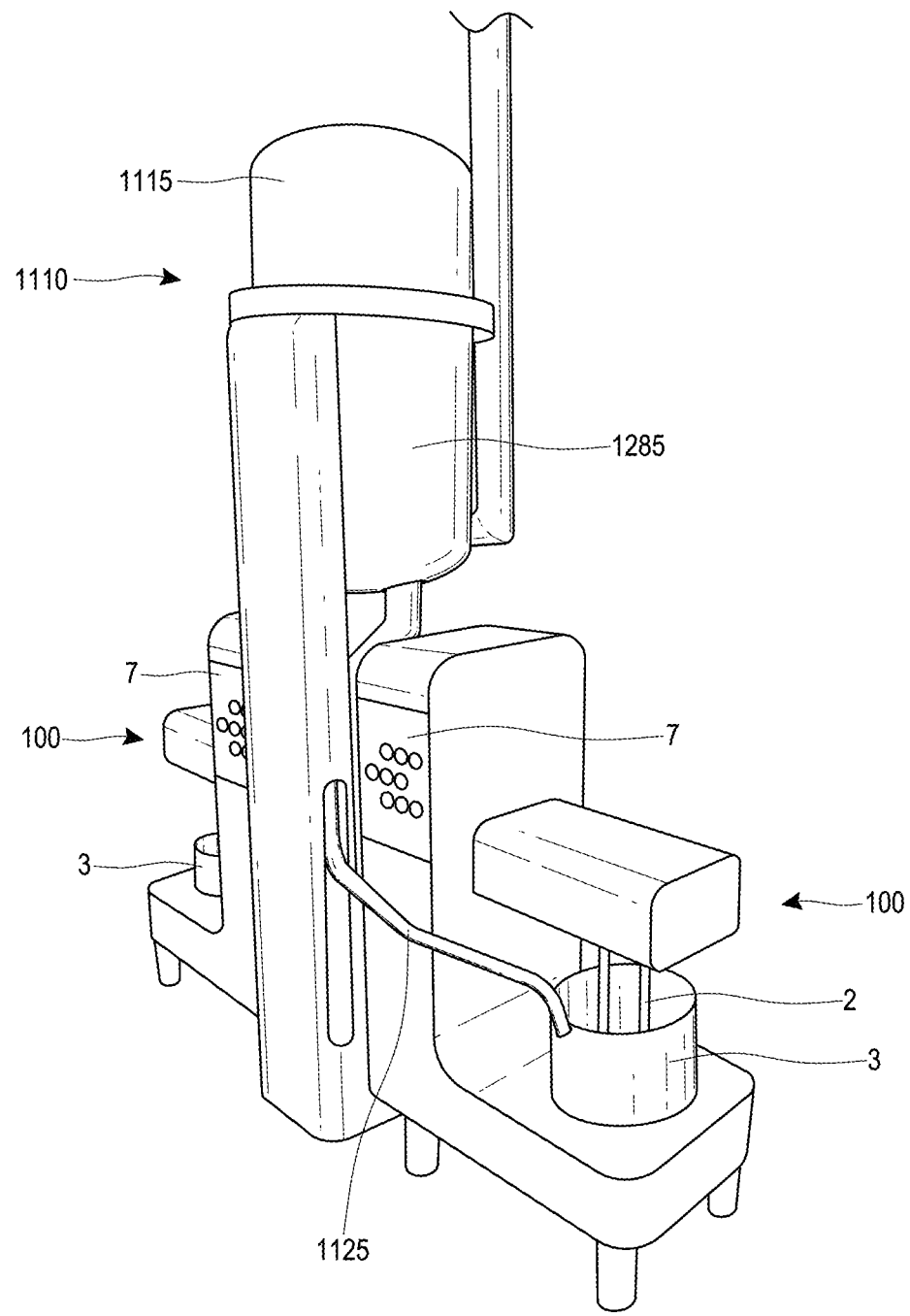

FIGS. 20A-20B illustrate an example of a kettle including a scoop doser 1110 situated between two example mixing machines 100. As illustrated the doser 1110 may be disposed in a raised position relative to the mixing machines 100 allowing for gravity to feed cryogenic liquid from the doser 1110 to the containers 3. The doser 1110 may be closed and sealed from the outside atmosphere via a cover 1115. The doser 1110 further comprises one or more output pipes 1125 (FIG. 20B) configured to direct cryogenic liquid from the reservoir 1285 to the containers 3. In embodiments with a doser 1110 situated between two mixing machines 100, there may be two separate output pipes 1125. Alternatively, there may be a single output pipe 1125 configured to adjust its position between each mixing machine 100 as needed. As is discussed in greater detail below, with reference to FIGS. 21 and 22, each mixing machine 100 may have a dedicated scoop 1256b, funnel 1275 and output pipe 1125.

FIG. 21 illustrates the kettle of FIG. 20 in an open state. FIG. 21 further illustrates the dipping cups or scoops 1256b and dipping mechanisms of the liquid dosing system, the dipping mechanisms including vertical shafts or rods 1280 and a ladder structure for tipping the scoops 1256b. As used herein, "vertical" can refer to positioning substantially parallel to a vector representing the acceleration due to gravity. In other embodiments the shafts 1280 can be angled relative to the vertical orientation and the ladder structure 2110 can be modified so that the dipping cups or scoops 1256b are maintained vertically, or close enough to vertical to avoid spilling the contained liquid, until reaching a designated position for tipping and releasing the contained liquid.

Figure 22:
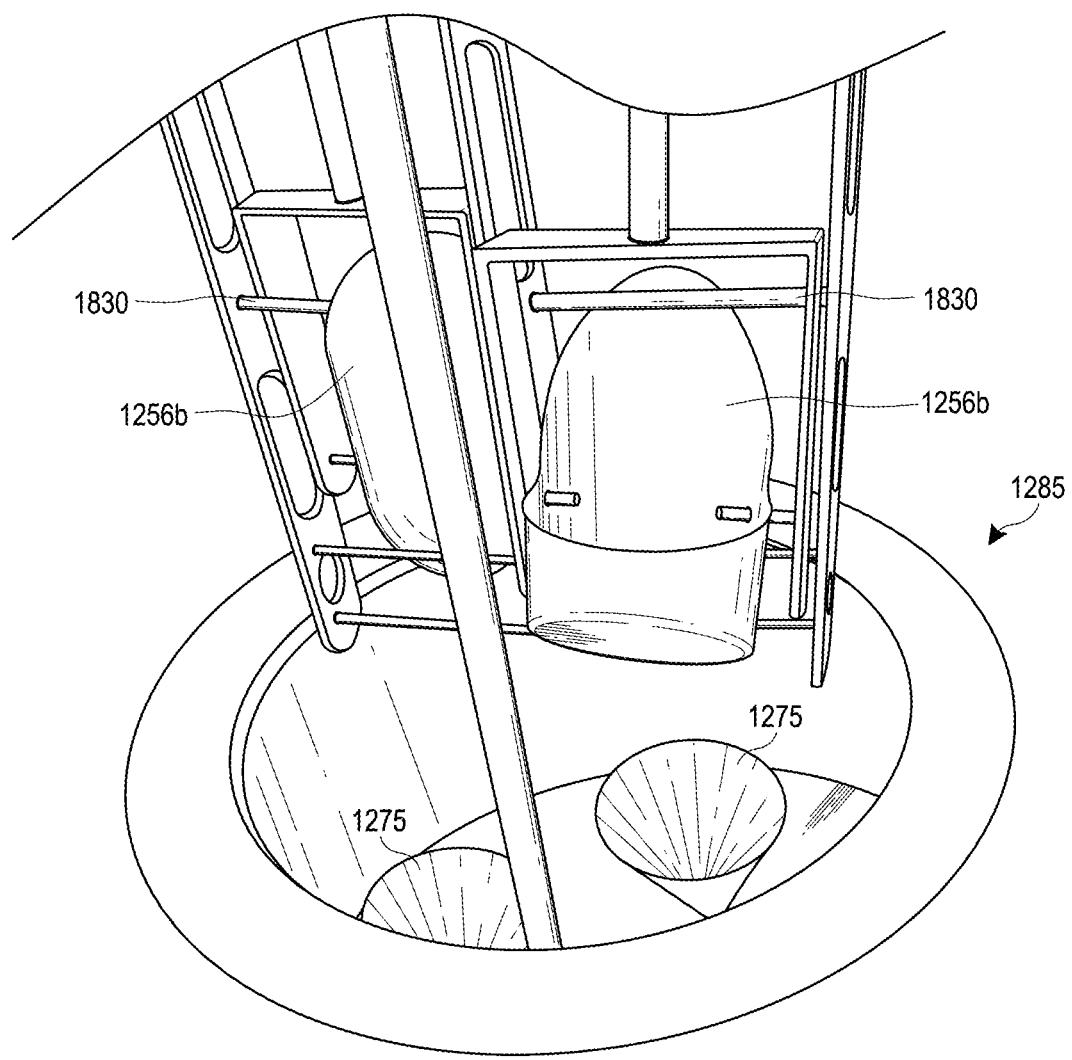
FIG. 22 illustrates another view of the kettle of FIG. 20 in the open state, showing the dipping cups, dipping mechanisms, level sensor, and funnels, each funnel having associated tubing to provide a liquid to one of the two mixers illustrated in FIG. 20.

FIGS. 21 and 22 illustrate a side view and a perspective view of a doser 1110 in an open state. Although FIGS. 21 and 22 depict two adjacent scooping mechanisms, it will be understood that the present embodiment could just as easily be implemented with one or more scooping mechanisms. Further, for clarity, when referring to FIGS. 21 and 22 only one scooping mechanism will be described. Referring to FIG. 21, in some embodiments the doser 1110 comprises a reservoir 1285, a cover 1115, a scoop 1256b, a ladder structure 2110, a cam 1830, and a lifting mechanism (not shown) mechanically connected to scoop 1256b via a rod, shaft, chain, belt, and/or wire, etc. 1280. The cover 1115 may be configured to close and/or seal the reservoir 1285 from the ambient atmosphere. The lifting mechanism may be configured to raise and lower scoop 1256b via the rod 1280. In some embodiments, the rod 1280 and the scoop 1256b are configured to pivot relative to one another. For instance, the rod 1280 may be coupled to the scoop 1256b with a hinge such that the scoop 1256b can rotate from a substantially vertical orientation to a substantially horizontal orientation. In some embodiments, the scoop 1256b is predisposed to orient in a substantially vertical orientation. Cam 1830 may include a fixed bar, rod, tab, gear, etc. positioned on the ladder structure 2110. In some embodiments the cam 1830 may be a fixed bar 1830 that is perpendicular to the transit path 1810 (FIG. 18) of the scoop 1256b. The cam 1830 may further be positioned in the transit path 1810 of scoop 1256b such that as the scoop 1256b is raised, at least a portion of the scoop 1256b comes into contact with the cam 1830. In some embodiments, the scoop 1256b may comprise a curved shape such that as the scoop 1256b is raised and comes into contact with the cam 1830, the scoop 1256b is forced to rotate from a substantially vertical orientation to a substantially horizontal orientation. The curved shape of the scoop 1256b may further allow the liquid nitrogen to flow out of the scoop 1256b in a controlled manner.

In some embodiments, the reservoir 1285 contains liquid nitrogen. The scoop 1256b may be lowered via the lifting mechanism down into the reservoir 1285 below a liquid level of the liquid nitrogen. As described in greater detail with reference to FIGS. 17A-18, the scoop 1256b may then collect liquid nitrogen and be raised by the lifting mechanism. In some embodiments, as scoop 1256b is raised, it contacts cam 1830, causing the scoop 1256b to rotate to a substantially horizontal orientation. As the scoop 1256b rotates to a substantially horizontal orientation, the liquid nitrogen contained therein flows out of the scoop 1256b in a controlled manner. In some embodiments, an angular position of the scoop 1256b is controlled incrementally so as to deliver cryogenic liquid in volumes that are small fractions of the volume of each scoop. In other words, scoop 1256b may dispense the cryogenic liquid incrementally so as to not deliver substantially all of the contents of the scoop 1256b at once. The rate at which the cryogenic liquid is delivered may correspond to an operating speed of the beaters 2 and/or a recipe selection.

Referring to FIG. 22, the doser 1110 may further include one or more outputs or funnels 1275. As discussed in greater detail with reference to FIGS. 12-14, 18, and 23, the funnel 1275 may be configured to receive cryogenic liquid from the scoop 1256b and to transfer the received cryogenic liquid out of the reservoir 1285. In some embodiments the funnel 1275 is positioned such that as scoop 1256b rotates from a substantially vertical orientation to a substantially horizontal orientation, cryogenic liquid within the scoop 1256b flows out of the scoop 1256b and into the funnel 1275. The top or upper rim of the funnel 1275 may be disposed at a height within the reservoir 1285 such that it is above a normal operational liquid level 1290 of the cryogenic liquid contained in the reservoir 1285. In some embodiments, the funnel 1275 is connected to output pipe 1125 (FIG. 20B) such that liquid nitrogen introduced into the funnel 1275 flows through the output pipe 1125 to the container 3. In this manner, a controlled quantity of cryogenic liquid may be transported to funnel 1275. As is discussed in greater detail with reference to FIGS. 12-14, the level of liquid nitrogen inside the reservoir 1285 can be monitored to ensure that the level does not go above or below predetermined thresholds. For instance, the level of liquid nitrogen may be maintained as to no go above the top of the funnel 1275 or below a lowest position of the scoop 1256b. In embodiments with more than one funnel 1275, each funnel 1275 may be in fluid communication with its own output pipe 1125 (FIG. 11) that leads to the same or different containers 3. In some embodiments, each scoop 1256b, funnel 1275 and output pipe 1125 services a single mixing machine 100. Thus, the dosing system 1110 may be configured to independently service multiple mixing machines 100.

FIG. 23 illustrates another view of the kettle of FIG. 20 in the open state, showing the funnels 1275. As illustrated, each funnel 1275 may comprise an upper portion 2310 and a lower portion 2320, the upper portion 2310 comprising a funnel-shaped receiver and the lower portion 2320 comprising a pipe. Each funnel 1275 is positioned to direct received liquid into a conduit extending generally vertically from an aperture in the bottom surface of the reservoir 1285. In other embodiments these conduits and their corresponding apertures can be positioned in different locations within the kettle, for example with the aperture positioned in a cylindrical side wall and the conduit extending at an angle from the aperture to the funnel. FIGS. 22 and 23 illustrate the reservoir 1285 of the kettle in an empty state. It will be appreciated that an upper rim of each funnel 1275 can be positioned at a height above the level of liquid in the kettle when filled such that only liquid poured into the funnels 1275 from scoops 1256b travels into the conduit and through the aperture toward a mixing bowl.

Although FIGS. 20-23 illustrate embodiments of a kettle having a liquid dosing system using scoops or dipping cups, in other embodiments such scoops can be omitted. For example, an actuator can cause a displacement body to be lowered down into the cryogenic fluid, displacing it in controlled volumes so that the liquid level rises above the lip of an exit tube and drains out of the reservoir.

Implementations disclosed herein provide systems, methods, and apparatus for dosing liquid. One skilled in the art will recognize that these embodiments may be implemented mechanically and manually in hardware, or programmatically in hardware combined with software and/or firmware. Some embodiments may be provided with a wired or wireless communication device. The communication device can be used for transmitting performance and/or operational data to a remote computing device, and/or for receiving instructions, for example recipe algorithms or firmware updates, from a remote computing device.

Several embodiments are specifically illustrated and/or described herein. However, it will be appreciated that modifications and variations are covered by the above teachings and within the scope of the appended claims without departing from the spirit and intended scope thereof. For example, the features of the various embodiments can be combined with one another, and corresponding features in the various embodiments can be interchangeable to achieve a desired system. Further, while ice cream is discussed herein, alternative embodiments of the invention may be applied to frozen yogurt or other frozen foods. In some embodiments one of the interlocking beaters is held stationary while the other is rotated. The use of gravity fed cryogenic liquids to freeze ingredients of frozen food products enables more reproducible dosing of liquid coolants, and thus a more reproducible product, relative to systems in which cryogenic liquids are provided at unpredictable pressures.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Implementing Systems and Terminology

Implementations disclosed herein provide systems, methods and apparatus for cryogenic liquid delivery. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, one or more image signal processors, a memory including instructions or modules for carrying out the processes discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. The term "coupled" may include communicatively coupled, electrically coupled, magnetically coupled, physically coupled, optically coupled, and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like. The phrase "based on" does not mean "based only on," unless expressly specified otherwise. In other words, the phrase "based on" describes both "based only on" and "based at least on."

The previous description of the disclosed implementations is provided to enable any person skilled in the art to make or use the present invention. Various modifications to these implementations will be readily apparent to those skilled in the art, and the generic principles defined herein may be applied to other implementations without departing from the scope of the invention. Thus, the present invention is not intended to be limited to the implementations shown herein but is to be accorded the widest scope consistent with the principles and novel features disclosed herein.

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A cryogenic liquid delivery system comprising:
    a reservoir configured to store a cryogenic liquid at atmospheric pressure;
    a sensor configured to sense a quantity of cryogenic liquid in the reservoir and produce signal of the sensed quantity;
    an input valve coupled to the reservoir and configured to open and close responsive to the signal to maintain the cryogenic liquid at an operational level within the reservoir;
    a first scoop configured to move along a transit path, the transit path including a lower position for receiving a portion of the cryogenic liquid into the first scoop, and an upper position for dispensing the received portion of cryogenic liquid from the first scoop;
    an actuator coupled to the first scoop, the actuator configured to move the first scoop between the upper and lower positions via the transit path; and
    a first output positioned to receive the dispensed portion of cryogenic liquid from the first scoop and to convey the received dispensed portion of cryogenic liquid from the reservoir.

2. The system of claim 1, wherein the first scoop is configured to rotate from a vertical orientation to a first horizontal orientation to dispense the received portion of cryogenic liquid from the first scoop, the rotation of the first scoop occurring during a transition of the first scoop from the lower position to the upper position.

3. The system of claim 2, wherein the first scoop is configured to be disposed in a second horizontal orientation in the lower position.

4. The system of claim 3, wherein the second horizontal orientation is sufficient to bring a lip of the first scoop below the operational level of cryogenic liquid such that the portion of the cryogenic liquid is received by the first scoop in the lower position and the second horizontal orientation.

5. The system of claim 3, wherein the first scoop is configured to rotate from the vertical orientation to the second horizontal orientation as the first scoop moves from an intermediate position to the lower position, the rotation being around an axis.

6. The system of claim 5, wherein the rotation of the first scoop around the axis is caused by contact between the first scoop and the cryogenic liquid.

7. The system of claim 2, wherein the rotation of the first scoop from the vertical orientation to the first horizontal orientation is caused by contact with a first cam, the first scoop catching on the first cam and rotating as the first scoop continues moving from an intermediate position to the upper position.

8. The system of claim 5, wherein the rotation of the first scoop around the axis is caused by contact with a cam, the first scoop catching on the cam and rotating as the first scoop continues moving from the intermediate position to the lower position.

9. The system of claim 1, wherein the first output comprises an upper portion and a lower portion, the upper portion comprising a funnel-shaped receiver and the lower portion comprising a pipe.

10. The system of claim 1, further comprising one or more additional scoops configured to move along their respective transit paths for delivering cryogenic liquid from the reservoir, each transit path including a lower position for receiving a portion of the cryogenic liquid into the respective scoop, and an upper position for dispensing the received portion of cryogenic liquid from the respective scoop.

11. The system of claim 10, further comprising one or more additional outputs, wherein each scoop is configured to convey the cryogenic liquid from the reservoir via one of the outputs.

12. The system of claim 10, wherein an angular position of each scoop is controlled incrementally so as to deliver cryogenic liquid in volumes that are small fractions of the volume of each scoop.

13. A system configured for producing a frozen confectionary, the system comprising:
- a container mount;
- a first container configured to hold ingredients of the frozen confectionary and to be attached to the container mount;
- a liquid doser configured to deliver a cryogenic liquid into the first container, the doser including:
  - a reservoir configured to store the cryogenic liquid at atmospheric pressure;
  - a first output configured to receive cryogenic liquid and deliver the received cryogenic liquid out of the reservoir and into the first container; and
  - a first scoop configured to transfer the portion of the cryogenic liquid within the reservoir to the first output, the first scoop configured to move between a first position for receiving the portion of the cryogenic liquid and a second position for dispensing the portion of the cryogenic liquid into the first output.

14. The system of claim 13, further comprising:
- one or more beaters configured to mix the ingredients in the first container contemporaneously with delivery of the cryogenic liquid dosing system; and
- an electronic controller configured to control an amount of the cryogenic liquid delivered into the container according to a selected recipe.

15. The system of claim 13, wherein the first scoop is configured to receive the portion of the cryogenic liquid while in a horizontal orientation in the first position, and the first scoop is further configured to rotate to an upright orientation to hold the cryogenic liquid after receiving the portion of the cryogenic liquid in the first position.

16. The system of claim 13, wherein the liquid doser includes a second scoop configured to rotate between horizontal and vertical orientations during transfer of a portion of the cryogenic liquid from the reservoir to a second container.

17. A method of operating a frozen confectionary production system having a user interface, a reservoir for holding a cryogenic liquid, an output through which cryogenic liquid flows out of the reservoir, and at least one scoop, the method comprising:
- adding a plurality of doses of a cryogenic liquid to a container, the container including ingredients for a frozen confectionary, wherein adding each dose of the plurality of doses includes:
- moving the at least one scoop to a first position in the reservoir to receive cryogenic liquid in the at least one scoop;
- raising the at least one scoop vertically with respect to the reservoir from the first position to a second position; and
- dispensing at least a portion of the cryogenic liquid from the scoop into an output port disposed in the reservoir when the scoop is at the second position to provide the dispensed cryogenic liquid into the container; and
- mixing the ingredients while adding the plurality of doses of the cryogenic liquid.

18. The method of claim 17, further comprising receiving at the user interface a selection of a recipe for the frozen confectionary, the recipe including information for controlling a rate to add the cryogenic liquid.

19. The method of claim 17, further comprising receiving at the user interface a selection of a recipe for the frozen confectionary, the recipe including information of an amount of cryogenic liquid to add to the container.

20. The method of claim 17, further comprising receiving at the interface an input selecting a recipe for a frozen confectionary, the recipe including information for a viscosity of the frozen confectionary at which to stop adding the doses of cryogenic liquid.

21. The method of claim 17, further comprising receiving at the user interface an input to begin or continue to mix the ingredients without dispensing any cryogenic liquid into the container.

22. The method of claim 17, further comprising receiving at the user interface an input to add cryogenic liquid to the container.

* * * * *